(12) United States Patent
Liu

(10) Patent No.: US 11,294,522 B2
(45) Date of Patent: Apr. 5, 2022

(54) TOUCH PANEL, TOUCH DISPLAY PANEL AND TOUCH DISPLAY DEVICE

(71) Applicants: HEFEI XINSHENG OPTOELECTRONICS TECHNOLOGY CO., LTD., Anhui (CN); BOE TECHNOLOGY GROUP CO., LTD., Beijing (CN)

(72) Inventor: Guodong Liu, Beijing (CN)

(73) Assignees: HEFEI XINSHENG OPTOELECTRONICS TECHNOLOGY CO., LTD., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 304 days.

(21) Appl. No.: 16/480,997

(22) PCT Filed: Nov. 9, 2018

(86) PCT No.: PCT/CN2018/114835
§ 371 (c)(1),
(2) Date: Jul. 25, 2019

(87) PCT Pub. No.: WO2019/218619
PCT Pub. Date: Nov. 21, 2019

(65) Prior Publication Data
US 2021/0333940 A1     Oct. 28, 2021

(30) Foreign Application Priority Data
May 16, 2018   (CN) .......................... 201810469455.6

(51) Int. Cl.
G06F 3/044     (2006.01)
G06F 3/041     (2006.01)
G06F 3/046     (2006.01)

(52) U.S. Cl.
CPC ............ *G06F 3/0446* (2019.05); *G06F 3/046* (2013.01); *G06F 3/0412* (2013.01); *G06F 2203/04111* (2013.01); *G06F 2203/04112* (2013.01)

(58) Field of Classification Search
CPC ...... G06F 3/0446; G06F 3/0412; G06F 3/046; G06F 2203/04111; G06F 2203/04112
See application file for complete search history.

(56) References Cited

U.S. PATENT DOCUMENTS 9,535,558 B2   1/2017   Lu et al.
9,639,220 B2   5/2017   Wang
(Continued)

FOREIGN PATENT DOCUMENTS

CN     103092446 A     5/2013
CN     103941946 A     7/2014
(Continued)

OTHER PUBLICATIONS

First Chinese Office Action dated Apr. 27, 2020; Application No. 201810469455.6
(Continued)

*Primary Examiner* — Lisa S Landis

(57) ABSTRACT

A touch panel, a touch display panel and a touch display device are provided. The touch panel includes a capacitive touch electrode and an electromagnetic touch electrode. The capacitive touch electrode includes a first mesh pattern, the first mesh pattern includes a plurality of first mesh lines, the plurality of the first mesh lines are intersected with each other, the electromagnetic touch electrode is insulated from the capacitive touch electrode and includes a second mesh pattern, and the second mesh pattern includes a plurality of second mesh lines, the plurality of the second mesh lines are intersected with each other.

18 Claims, 15 Drawing Sheets

(56) References Cited

U.S. PATENT DOCUMENTS

| | | | |
|---|---|---|---|
| 9,904,406 B2 | 2/2018 | Zou | |
| 10,534,483 B2 | 1/2020 | Lee et al. | |
| 10,572,056 B2 * | 2/2020 | Gwon | G06F 3/041 |
| 2004/0183788 A1 | 9/2004 | Kurashima et al. | |
| 2017/0255316 A1 | 9/2017 | Tahara | |
| 2018/0120971 A1 * | 5/2018 | Lee | G06F 3/0446 |
| 2018/0321763 A1 | 11/2018 | Liu et al. | |

FOREIGN PATENT DOCUMENTS

| | | |
|---|---|---|
| CN | 104298411 A | 1/2015 |
| CN | 104375732 A | 2/2015 |
| CN | 105487736 A | 4/2016 |
| CN | 105511664 A | 4/2016 |
| CN | 105975141 A | 9/2016 |
| CN | 106293200 A | 1/2017 |
| CN | 206021229 U | 3/2017 |
| CN | 106940605 A | 7/2017 |
| CN | 107239181 A | 10/2017 |
| CN | 107533411 A | 1/2018 |
| CN | 107688414 A | 2/2018 |
| JP | 2017227983 A | 12/2017 |

OTHER PUBLICATIONS

The Third Chinese Office Action dated Jul. 9, 2021; Appln. No. 201810469455.6.
The Extended European Search Report dated Jan. 4, 2022; Appln. No. 18900564.8.

* cited by examiner

TOUCH PANEL, TOUCH DISPLAY PANEL AND TOUCH DISPLAY DEVICE

The present application claims the priority of the Chinese Patent Application No. 201810469455.6 filed on May 16, 2018, the disclosure of which is incorporated herein by reference as a part of the present application.

TECHNICAL FIELD

Embodiments of the present disclosure relate to a touch panel, a touch display panel and a touch display device.

BACKGROUND

Capacitive touch technology serves for detecting a finger touch operation, especially in a large size touch product, so the capacitive touch technology enables users to make convenient and simple touch operations. At present, the capacitive touch technology has been widely used in electronic display products, but the touch precision of the kind of the capacitive touch products does not reach the precision of electromagnetic induction touch, so it cannot perform a very fine operation. Considering the advantages and disadvantages of the capacitive touch technology and the electromagnetic induction touch technology, the capacitive touch technology and the electromagnetic induction touch technology can be combined to achieve a better touch effect.

SUMMARY

At least one embodiment of the present disclosure provides a touch panel, and the touch panel comprises: a capacitive touch electrode, which comprises a first mesh pattern, an the first mesh pattern comprises a plurality of first mesh lines which are intersected with each other; and an electromagnetic touch electrode, which is insulated from the capacitive touch electrode and comprising a second mesh pattern, and the second mesh pattern comprises a plurality of second mesh lines which are intersected with each other.

For example, in the touch panel provided by at least one embodiment of the present disclosure, the first mesh pattern and the second mesh pattern are arranged in a same layer, and both the first mesh pattern and the second mesh pattern are extended along a first direction; and the first mesh pattern and the second mesh pattern are spaced apart from each other to insulate the capacitive touch electrode from the electromagnetic touch electrode.

For example, in the touch panel provided by at least one embodiment of the present disclosure, the plurality of the first mesh lines and the plurality of the second mesh lines are spaced apart from each other by a plurality of first gaps which are spaced apart from each other to separate the first mesh pattern from the second mesh pattern; and the plurality of the first gaps are along the first direction and located on a plurality of straight lines parallel to the first direction respectively.

For example, in the touch panel provided by at least one embodiment of the present disclosure, the plurality of the first gaps in odd columns are along the first direction and on a straight line parallel to the first direction; and the plurality of the first gaps in even columns are along the first direction and on another straight line parallel to the first direction.

For example, in the touch panel provided by at least one embodiment of the present disclosure, all the plurality of the first mesh lines and all the plurality of the second mesh lines are straight line segments, an extension line of each of the plurality of the second mesh lines is extended across one of the plurality of the first gaps and coincides with one of the plurality of the first mesh lines.

For example, in the touch panel provided by at least one embodiment of the present disclosure, the first mesh pattern and the second mesh pattern are configured in such a way that a portion of the second mesh pattern overlaps a portion of the first mesh pattern in condition that the second mesh pattern is translated in a second direction being intersected with the first direction.

For example, in the touch panel provided by at least one embodiment of the present disclosure, the electromagnetic touch electrode comprises a first portion, a second portion and a connection line, and the first portion is electrically connected with the second portion by the connection line; and both the first portion and the second portion comprise the second mesh pattern and extend along the first direction, and the first mesh pattern is located between the first portion and the second portion of the electromagnetic touch electrode.

For example, the touch panel provided by at least one embodiment of the present disclosure, further comprises an outer contour, and an extending direction of at least a portion of the plurality of the first mesh lines or an extending direction of at least a portion of the plurality of the second mesh lines intersects with the outer contour and is not perpendicular to the outer contour.

For example, in the touch panel provided by at least one embodiment of the present disclosure, the first mesh pattern comprises a plurality of first mesh units, the plurality of the first mesh units are in a same shape and periodically arranged, and the first mesh pattern comprises a plurality of second mesh units, the plurality of the second mesh units are in a same shape and periodically arranged.

For example, in the touch panel provided by at least one embodiment of the present disclosure, both the first mesh units and the second mesh units are in a shape of a diamond, a circle, a parallelogram, or a triangle.

For example, the touch panel provided by at least one embodiment of the present disclosure, further comprises: another capacitive touch electrode, which comprises a third mesh pattern, in which the third mesh pattern comprises a plurality of third mesh lines which are intersected with each other; and another electromagnetic touch electrode, which comprises a fourth mesh pattern, in which the fourth mesh pattern comprises a plurality of fourth mesh lines which are intersected with each other, in which both the another capacitive touch electrode and the another electromagnetic touch electrode are insulated from each of the capacitive touch electrode and the electromagnetic touch electrode.

For example, in the touch panel provided by at least one embodiment of the present disclosure, the third mesh pattern and the fourth mesh pattern are arranged in a same layer, and both the third mesh pattern and the fourth mesh pattern are extended along the second direction which is intersected with the first direction, and the third mesh pattern and the fourth mesh pattern are spaced apart from each other; a layer where the first mesh pattern and the second mesh pattern are located and a layer where the third mesh pattern and the fourth mesh pattern are located are arranged in a stacked manner; and in a direction perpendicular to the layer where the first mesh pattern and the second mesh pattern are located and the layer where the third mesh pattern and the fourth mesh pattern are located, a portion of the third mesh lines and a portion of the fourth mesh lines overlap a portion of the first mesh lines and a portion of the second mesh lines.

For example, in the touch panel provided by at least one embodiment of the present disclosure, the plurality of the third mesh lines and the plurality of the fourth mesh lines are spaced apart from each other by a plurality of second gaps which are spaced apart from each other to separate the third mesh pattern from the fourth mesh pattern; and the plurality of the second gaps are along the second direction and located on a plurality of straight lines parallel to the second direction respectively.

For example, the touch panel provided by at least one embodiment of the present disclosure, further comprises: a base substrate and an insulating layer, in which the first mesh pattern, the second mesh pattern, the third mesh pattern and the fourth mesh pattern are arranged on a same side of the base substrate; and the insulating layer is arranged between the layer where the first mesh pattern and the second mesh pattern are located and the layer where the third mesh pattern and the fourth mesh pattern are located.

For example, the touch panel provided by at least one embodiment of the present disclosure, further comprises a base substrate, in which the first mesh pattern and the second mesh pattern are arranged on a first side of the base substrate; and the third mesh pattern and the fourth mesh pattern are arranged on a second side of the base substrate, and the second side is opposite to the first side.

For example, the touch panel provided by at least one embodiment of the present disclosure, further comprises a first base substrate and a second base substrate which are opposite to each other, in which the first mesh pattern and the second mesh pattern are arranged on the first base substrate; and the third mesh pattern and the fourth mesh pattern are arranged on the second base substrate.

For example, in the touch panel provided by at least one embodiment of the present disclosure, the third mesh pattern and the fourth mesh pattern are arranged on a side of the second base substrate away from the first base substrate.

At least one embodiment of the present disclosure further provides a touch display panel, and the touch display panel comprises any one of the touch panels described above.

For example, the touch display panel provided by at least one embodiment of the present disclosure, further comprises a display layer, and the display layer comprises a plurality of signal lines which are intersected with each other; and an orthographic projection of at least a portion of the plurality of first mesh lines or an orthographic projection of at least a portion of the second mesh line on the display layer intersects with the signal lines and is not perpendicular to the signal lines.

At least one embodiment of the present disclosure further provides a touch display device, and the touch display device comprises any one of the touch display panels described above.

BRIEF DESCRIPTION OF THE DRAWINGS

In order to clearly illustrate the technical solution of the embodiments of the present disclosure, the drawings of the embodiments will be briefly described. It is apparent that the described drawings are only related to some embodiments of the present disclosure and thus are not limitative of the present disclosure.

DETAILED DESCRIPTION

In order to make objects, technical details and advantages of embodiments of the disclosure clear, the technical solutions of the embodiments will be described in a clearly and fully understandable way in connection with the related drawings. It is apparent that the described embodiments are just a part but not all of the embodiments of the disclosure. Based on the described embodiments herein, those skilled in the art can obtain, without any inventive work, other embodiment(s) which should be within the scope of the disclosure.

Unless otherwise defined, all the technical and scientific terms used herein have the same meanings as commonly understood by one of ordinary skill in the art to which the present invention belongs. The terms "first," "second," etc., which are used in the description and claims of the present application, are not intended to indicate any sequence, amount or importance, but to distinguish various components. The terms "comprises," "comprising," "includes," "including," etc., are intended to specify that the elements or the objects stated before these terms encompass the elements or the objects listed after these terms as well as equivalents thereof, but do not exclude other elements or objects. The phrases "connect", "connected", etc., are not intended to define a physical connection or mechanical connection, but may include an electrical connection which is direct or indirect. The terms "on," "under," "right," "left" and the like are only used to indicate relative position relationship, and when the position of an object is described as being changed, the relative position relationship may be changed accordingly.

Dimensions of the drawings in the embodiments of the present disclosure are not strictly drawn to actual scales. The number of the capacitive touch electrode, the number of the electromagnetic touch electrode, the number of another capacitive touch electrode and the number of another electromagnetic touch electrode in the touch panel are not limited to the numbers shown in the figures. The number of the first mesh line, the number of the second mesh line, the number of the third mesh line and the number of the fourth mesh line are also not limited to the number shown in the figures. The specific size and the quantity of each of the structures are determined according to the actual requirements. The drawings described in the embodiments of the present disclosure are merely schematic structural diagrams.

Figure 1:
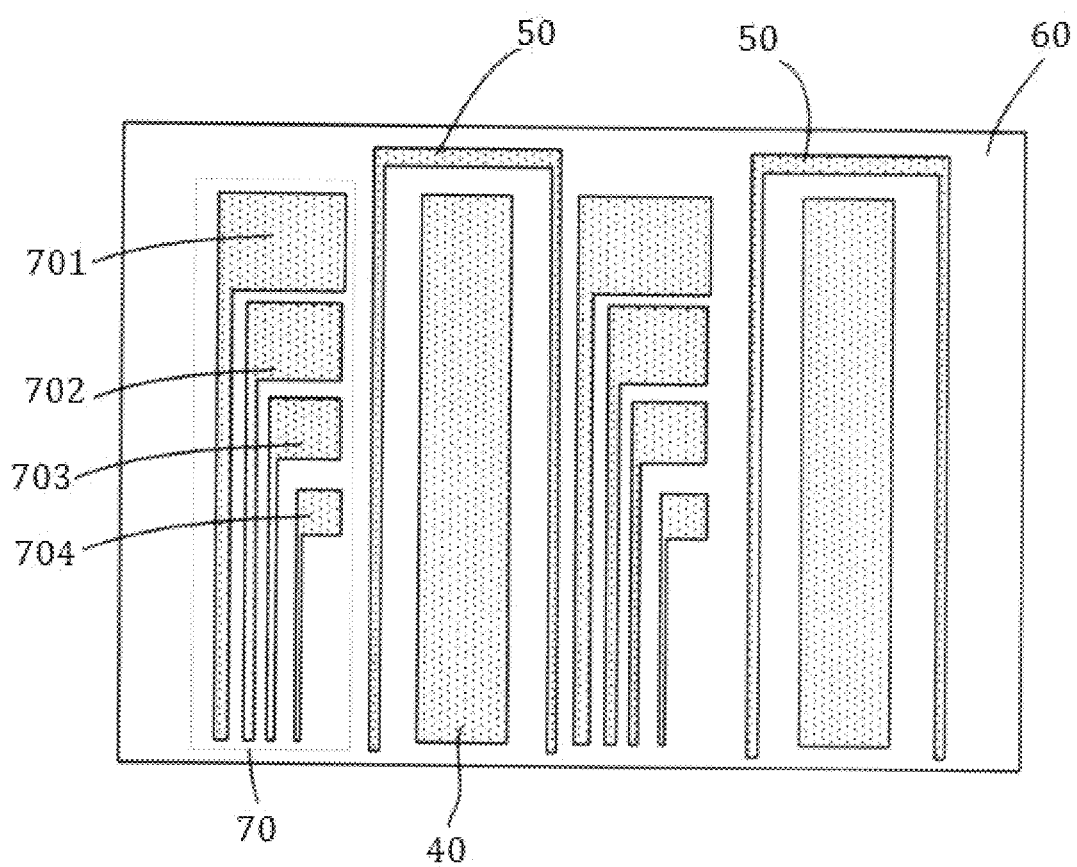
FIG. 1 is a schematic diagram of a touch panel.

FIG. 1 is a schematic diagram of a touch panel. The touch panel shown in FIG. 1 comprises a base substrate 60 and a touch electrode disposed on the base substrate 60. The touch electrode comprises a plurality of capacitive driving electrodes 70, a plurality of capacitive induction electrodes 40 and a plurality of electromagnetic induction coils 50, each of the capacitive driving electrodes 70 comprises a plurality of sub-driving electrodes 701, 702, 703, and 704 arranged in sequence. In the touch panel shown in FIG. 1, a pattern of each of the capacitive induction electrodes 40 is in a shape of a stripe, and both a pattern of each of the capacitive driving electrodes 70 and a pattern of each of the electromagnetic induction coils 50 includes striped structures. All of the above-mentioned striped structures in the touch electrode are horizontal or vertical, that is, all of the above-mentioned striped structures are parallel to or perpendicular to a transverse outer contour of the base substrate 60, or all of the above-mentioned striped structures are parallel to or perpendicular to a longitudinal outer contour of the base substrate 60. On one hand, a resistance of the electromagnetic induction coil 50 which is composed of a narrower striped structure is larger, and it is not conducive to increasing sensitivity of electromagnetic touch. On the other hand, in a case that the touch panel is applied to a display panel, in the display panel, an opaque signal line (such as a mesh line, a data line, etc.) in a pixel layer or a black matrix (such as in a liquid crystal display panel) is usually parallel to or perpendicular to the transverse outer contour of the base substrate, or parallel to or perpendicular to the longitudinal outer contour of the base substrate, and the striped structures of the touch electrodes of the touch panel are also parallel to or perpendicular to the transverse outer contour of the base substrate 60, or parallel to or perpendicular to the longitudinal outer contour of the base substrate 60, in this way, the pattern of the touch electrodes easily produces a Mura pattern effect with the signal lines of the pixel layer or the pattern of the black matrix, which seriously affects the display effect of the display panel.

At least one embodiment of the present disclosure provides a touch panel, and the touch panel comprises a capacitive touch electrode and an electromagnetic touch electrode. The capacitive touch electrode comprises a first mesh pattern, and the first mesh pattern comprises a plurality of first mesh lines which are intersected with each other. The electromagnetic touch electrode is insulated from the capacitive touch electrode and comprises a second mesh pattern, and the second mesh pattern comprises a plurality of second mesh lines which are intersected with each other. For example, the touch panel provided by the embodiment of the present disclosure can be used in products with a touch function such as a display device, a touch pad for controlling a mouse of a notebook computer, and a touch electronic lock etc.

For example, the touch panel is a self-capacitive touch panel or a self-inductance electromagnetic touch panel. For example, in the touch panel provided by an embodiment of the present disclosure, the touch panel comprises only one touch electrode layer, and the first mesh pattern and the second mesh pattern are arranged in a same layer, i.e., in the same touch electrode layer.

Figure 2A:
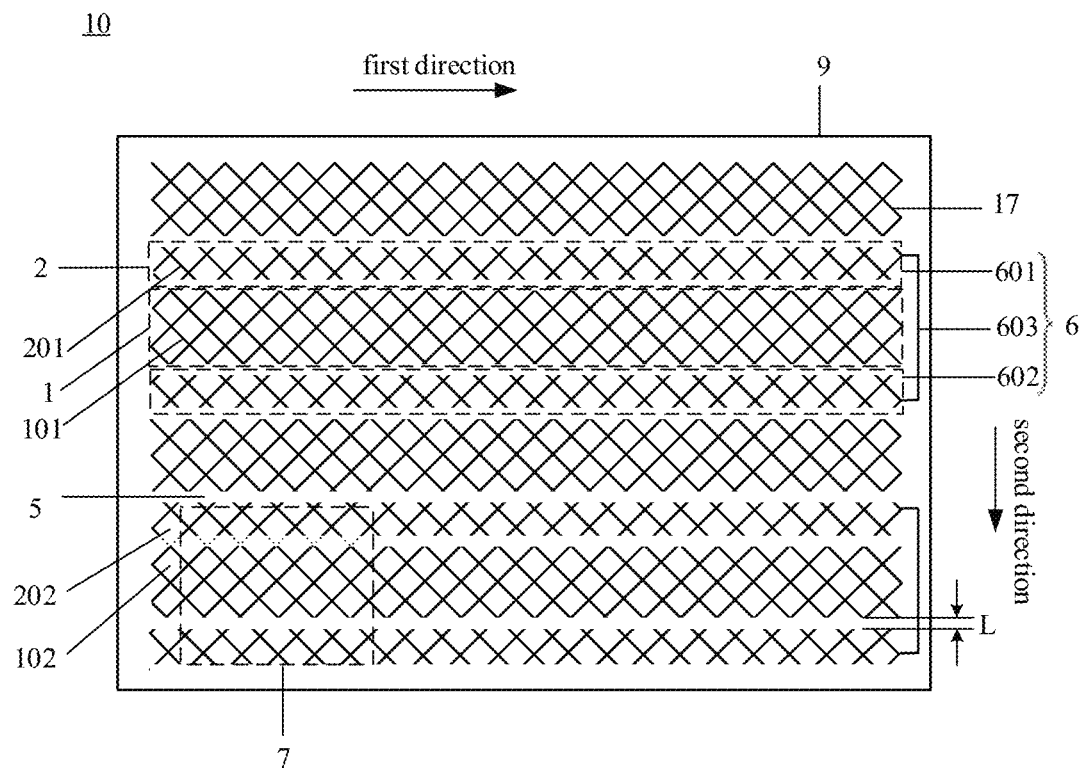
FIG. 2A is a planar schematic diagram of a first touch electrode layer of a touch panel provided by an embodiment of the present disclosure.
Figure 2B:
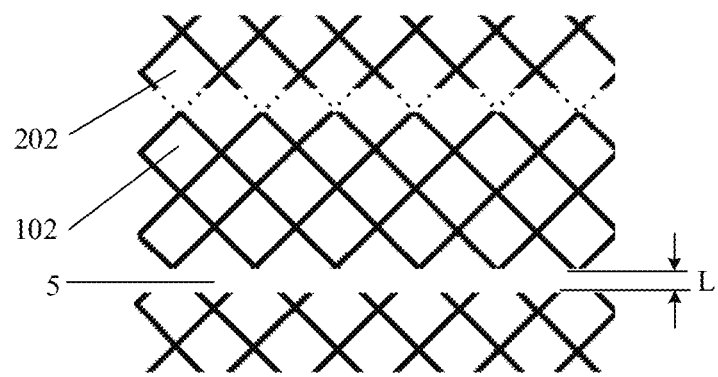
FIG. 2B is a partial enlargement schematic diagram of FIG. 2A.

Exemplarily, FIG. 2A is a planar schematic diagram of a first touch electrode layer of a touch panel provided by an embodiment of the present disclosure, and FIG. 2B is a partial enlargement schematic diagram of FIG. 2A. As illustrated in FIG. 2A, the first touch electrode layer 10 comprises a capacitive touch electrode 17 and an electromagnetic touch electrode 6 which are arranged in a same layer. The capacitive touch electrode 17 and the electromagnetic touch electrode 6 are arranged in the same layer, which is beneficial to thinning the touch panel and simplifying the structure of the panel, and in the process of manufacturing the touch panel, the pattern of the capacitive touch electrode 17 and the pattern of the electromagnetic touch electrode 6 can be formed by a same patterning process, which is beneficial to simplifying the manufacturing process. For example, the touch panel comprises a plurality of capacitive touch electrodes 17 and a plurality of electromagnetic touch electrodes 6. Of course, in other embodiments of the present disclosure, the touch panel may also comprise one capacitive touch electrode 17 and one electromagnetic touch electrode 6, and the embodiments of the present disclosure do not limit the number of the capacitive touch electrodes 17 and the number of the electromagnetic touch electrodes 6. For example, each of the capacitive touch electrodes 17 comprises a first mesh pattern 1, and the first mesh pattern 1 comprises a plurality of first mesh lines 101 which are intersected with each other. Each of the electromagnetic touch electrodes 6 is insulated from each of the capacitive touch electrodes 17, and each of the electromagnetic touch electrodes 6 comprises a second mesh pattern 2, and the second mesh pattern 2 comprises a plurality of second mesh lines 201 which are intersected with each other. The touch panels provided by the embodiments of the present disclosure can realize both capacitive touch and electromagnetic induction touch at the same time. Compared with a touch electrode in a strip shape and having no mesh pattern, on one hand, both the first mesh pattern 1 and the second mesh pattern 2 of the touch panel provided by the present disclosure increase an arrangement density of the capacitive touch electrodes 17 and the electromagnetic touch electrodes 6, respectively. Thus, it can increase a capacitive touch precision and an electromagnetic touch precision of the touch panel while ensuring the transmittance. Even for a large size touch panel, it can also achieve a high capacitance touch precision and a high electromagnetic touch precision. On the other hand, in the first mesh pattern 1 and the second mesh pattern 2, at least a portion of the first mesh lines 101 are arranged in parallel and/or at least a portion of the second mesh lines 2 are arranged in parallel, which can reduce the resistances of the capacitive touch electrodes 17 and the resistances of the electromagnetic touch electrodes 6 and increase the sensitivity of touch.

For example, as illustrated in FIG. 2A, both the first mesh pattern 1 and the second mesh pattern 2 extend along the first direction, and the first mesh pattern 1 and the second mesh pattern 2 are spaced apart from each other to insulate the capacitive touch electrode from the electromagnetic touch electrode 6. For example, the touch panel has an outer contour 9, and the first direction is horizontally parallel to the outer contour 9 of the touch panel. For example, the plurality of the first mesh lines 101 and the plurality of the second mesh lines 201 are spaced apart from each other by a plurality of first gaps 5 to separate the first mesh pattern 1 from the second mesh pattern 2; and along the first direction, the plurality of the first gaps 5 are located on a same straight line which is parallel to the first direction to facilitate patterning. That is, as illustrated in FIG. 2A, a gap in a strip shape as a whole and composed of the plurality of first gaps 5 is between the first mesh pattern 1 and the second mesh pattern 2 to make the first mesh pattern 1 and the second mesh pattern 2 space apart from each other and to insulate the capacitive touch electrode 17 from the electromagnetic touch electrode 6. In the embodiment shown in FIG. 2A, the gap composed of the plurality of first gaps 5 is in a linear shape. Of course, in other embodiments of the present disclosure, the gap composed of the plurality of the first gaps 5 is in a curved shape, such as a zigzag or a wavy, etc., which are not limited in the embodiments of the present disclosure.

For example, the electromagnetic touch electrode 6 comprises a first portion 601, a second portion 602 and a connection line 603, and the first portion 601 is electrically connected with the second portion 602 by the connection line 603 to form an electromagnetic induction coil. Both the first portion 601 and the second portion 602 comprise the second mesh pattern 2 and extend along the first direction, and the first mesh pattern 1 is located between the first portion 601 and the second portion 602 of the electromagnetic touch electrode. In other words, in the embodiment shown in FIG. 2A, the first gaps 5 are not only between the capacitive touch electrode 17 and the first portion 601 of the electromagnetic touch electrode 6, but also between the capacitive touch electrode 17 and the second portion 602 of the electromagnetic touch electrode 6 to insulate the capacitive touch electrode 17 from the electromagnetic touch electrode 6.

For example, the first mesh pattern 1 and the second mesh pattern 2 are constructed in such a way that: a portion of the second mesh pattern 2 overlaps a portion of the first mesh pattern 1 in condition that the second mesh pattern 2 is translated in a second direction being intersected with the first direction. For example, in FIG. 2A, the second direction is perpendicular to the first direction. For example, as illustrated in FIG. 2A and FIG. 2B, the first mesh pattern 1 comprises a plurality of first mesh units 102 which are in a same shape and periodically arranged. Extension lines of the second mesh lines 201 of the second mesh pattern 2 are intersected with each other to form closed structures, which are second mesh units 202, and the second mesh units 202 are in a same shape and periodically arranged. A planar shape of each of the first mesh units 102 is the same as a planar shape of each of the second mesh units 202, and the arrangement period of the first mesh units 102 is the same as the arrangement period of the second mesh units 202. For example, as illustrated in FIG. 2A, both the planar shape of each of the first mesh units 102 and the planar shape of each of the second mesh units 202 are a diamond. Of course, the planar shape of each of the first mesh units 102 and the planar shape of each of the second mesh units 202 may also be other shapes other than the diamond. On the one hand, the above-mentioned construction of the first mesh pattern 1 and the second mesh pattern 2 is beneficial to the formation of the first mesh pattern 1 and the second mesh pattern 2 by the patterning process; on the other hand, in a case that the touch panels provided in the embodiments of the present disclosure are used in the display panel, the above-mentioned configuration of the first mesh pattern 1 and the second mesh pattern 2 is beneficial to the uniformity of light emitted from the display panel, which reduces or avoids a display defect, such as a Mura defect caused by uneven transmission of light in the first touch electrode layer 10.

For example, as shown in FIG. 2A, the plurality of the first mesh lines 101 and the plurality of the second mesh lines 201 are straight line segments, an extension line of each of the plurality of the second mesh lines 201 is extended across one of the plurality of the first gaps 5 and coincides with one of the plurality of the first mesh lines 101. Of course, in the touch panel provided by other embodiments of the present disclosure, the plurality of the first mesh lines 101 and the plurality of the second mesh lines 201 are not limited to the structure in FIG. 2A. In a case that the touch panels provided in the embodiments of the present disclosure are used in the display panel, the above mentioned pattern can make the pattern of the capacitive touch electrodes 17 and the pattern of the electromagnetic touch electrodes 6 uniformly arranged as a whole, which is beneficial to the uniformity of light emitted from the display panel, which reduces or avoids a display defect, such as a Mura defect caused by uneven transmission of light in the first touch electrode layer 10.

For example, the dimensions of the plurality of first gaps 5 are substantially the same, which facilitates the formation of the first mesh pattern 1 and the second mesh pattern 2 by the patterning process. In a case that the touch panel is applied to the display panel, it is further beneficial to the uniformity of the light emitted from the display panel.

For example, a dimension L of each of the first gaps 5 is less than 10 μm. In the case that the touch panel is applied to the display panel, if the size of the first gap 5 is too large, the display defect, such as the Mura defect may occur due to the uneven transmission of light from the first touch electrode layer 10. Therefore, the dimension L of each of the first gaps 5 is less than 10 μm, which is beneficial to reducing the defect.

For example, as shown in FIG. 2A, an extending direction of at least a portion of the plurality of the first mesh lines 101 or an extending direction of at least a portion of the plurality of the second mesh lines 201 intersects with an outer contour 9 and is not perpendicular to the outer contour 9 of the touch panel. In a display panel, an opaque signal line (such as a mesh line, a data line, etc.) in a pixel layer or a black matrix (such as in a liquid crystal display panel) is usually parallel to or perpendicular to the outer contour 9. In a case that the touch panel is applied to the display panel, it is beneficial to increasing or preventing the Mura pattern effect, which can obtain a better visual display effect.

Figure 2C:
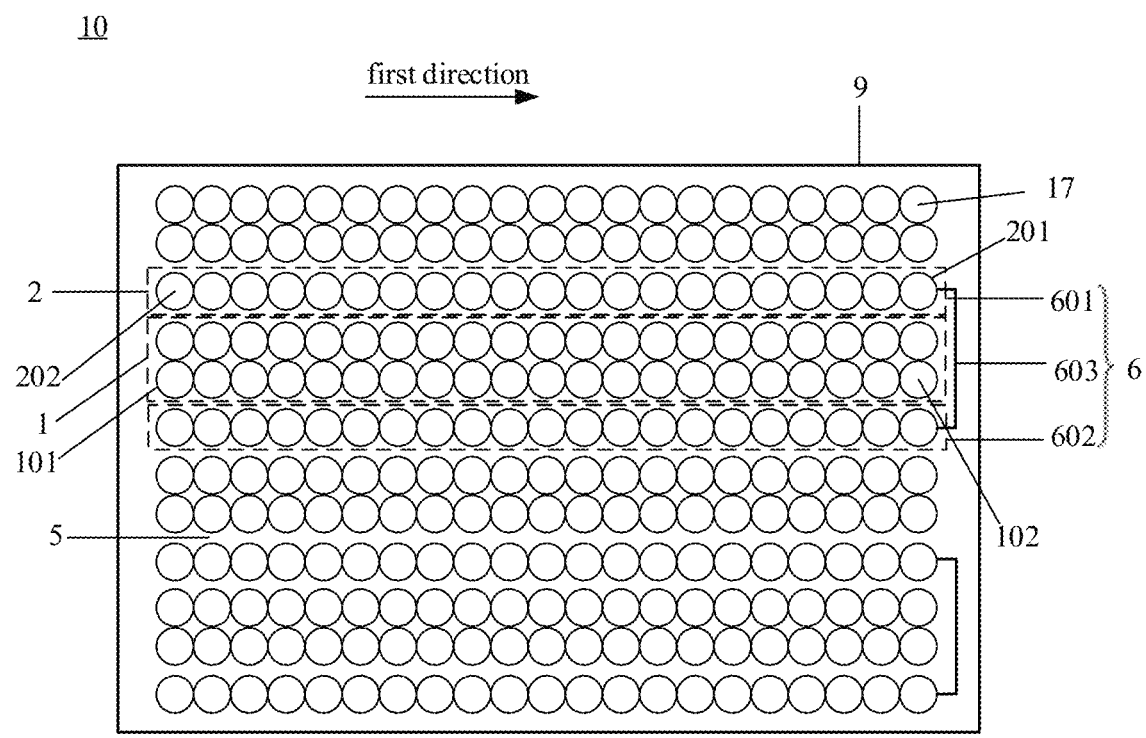
FIG. 2C is another planar schematic diagram of a first touch electrode layer of a touch panel provided by an embodiment of the present disclosure.

In other embodiments of the present disclosure, the second mesh pattern 2 comprises a plurality of second mesh units 202 which are in a same shape and periodically arranged. That is, the second mesh unit 202 is formed by intersecting the second mesh lines 201 instead of the extension lines of the second mesh lines 201. For example, FIG. 2C is another planar schematic diagram of a first touch electrode layer of a touch panel provided by an embodiment of the present disclosure. The difference between the touch electrode layer 10 shown in FIG. 2C and the touch electrode layer 10 shown in FIG. 2A is that the second mesh pattern 2 comprises a plurality of second mesh units 202 which are in a same shape and periodically arranged, and both the shape of each of the first mesh units 102 and the shape of each of the second mesh units 202 are circular. The other characteristics of the capacitive touch electrodes and the electromagnetic touch electrodes in FIG. 2C are the same as those in FIG. 2A. Of course, in the touch panel provided in the embodiment of the present disclosure, both the shape of each of the first mesh units 102 and the shape of each of the second mesh units 202 are not limited to the shape of a diamond and the shape of a circular, for example, may be other shapes such as a shape of a parallelogram or a shape of a triangle, which are not limited in the embodiments of the present disclosure.

Figure 2D:
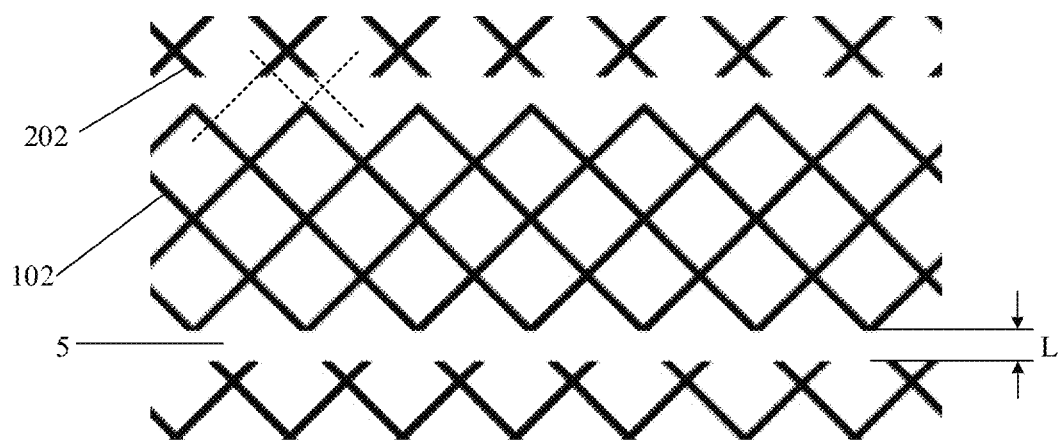
FIG. 2D is another partial enlargement schematic diagram of FIG. 2A.

For example, FIG. 2D is another partial enlargement schematic diagram of FIG. 2A. The difference between the first touch electrode layer shown in FIG. 2D and the first touch electrode layer shown in FIG. 2B is that the extension lines of the second mesh lines 201 are extended across the first gaps 5 and are not coincide with the first mesh lines 101. The other characteristics of the capacitive touch electrodes 17 and the electromagnetic touch electrodes 6 in FIG. 2D are the same as those in FIG. 2B.

Figure 2E:
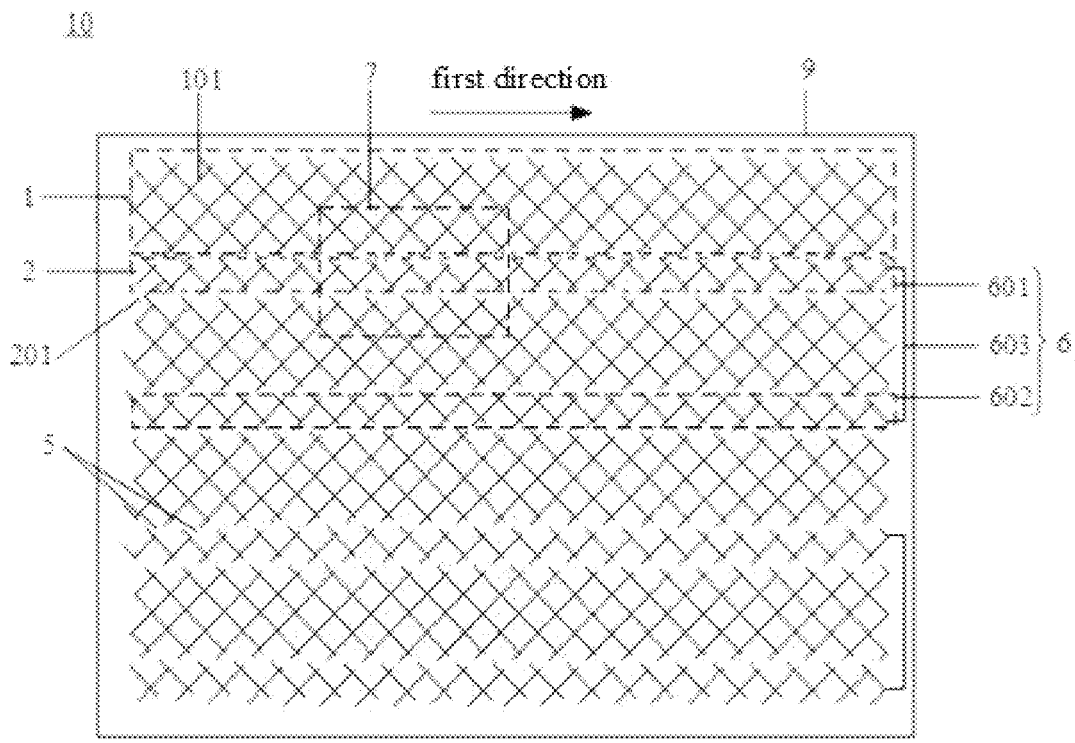
FIG. 2E is still another planar schematic diagram of a first touch electrode layer of a touch panel provided by an embodiment of the present disclosure.
Figure 2F:
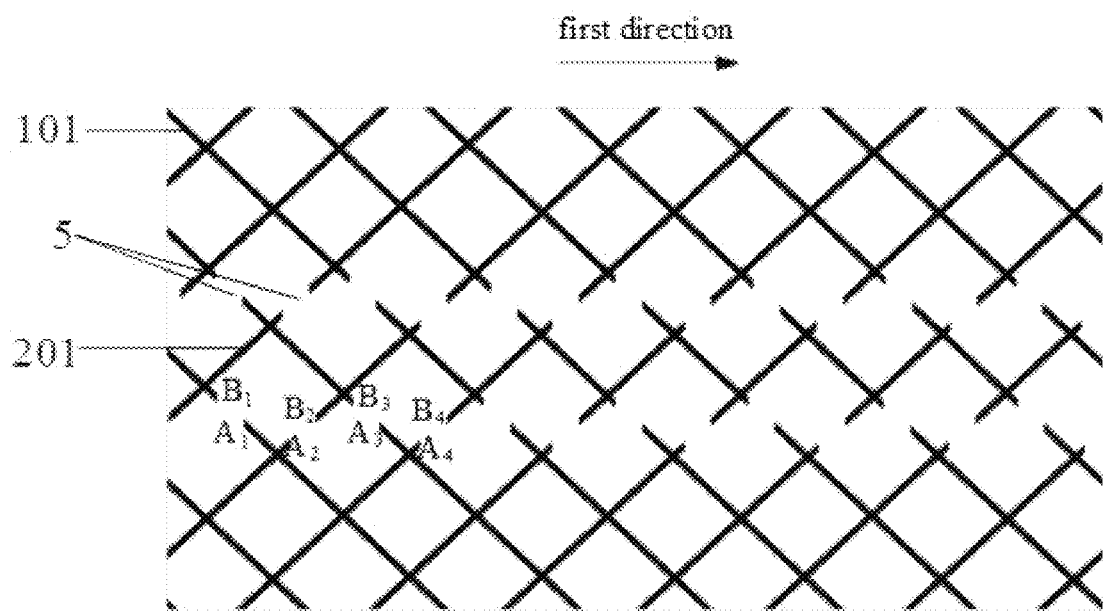
FIG. 2F is a partial enlargement schematic diagram of FIG. 2E.

FIG. 2E is still another planar schematic diagram of a first touch electrode layer of a touch panel provided by an embodiment of the present disclosure, and FIG. 2F is a partial enlargement schematic diagram of a portion 7 of the first touch electrode layer of FIG. 2E. As shown in FIG. 2E and FIG. 2F, the plurality of the first mesh lines 101 and the plurality of the second mesh lines 201 are spaced apart from each other by the plurality of first gaps 5 which are spaced apart from each other to separate the first mesh pattern 1 from the second mesh pattern 2; and the plurality of the first gaps 5 are along the first direction and located on a plurality of straight lines parallel to the first direction respectively. That is, the plurality of the first gaps 5 are not located in a same straight line. Comparing with the case that the first mesh pattern 1 is spaced apart from the second mesh pattern 2 by a whole gap (the embodiments shown in FIG. 2A to FIG. 2D), the first mesh lines 101 of the capacitive touch electrode 17 and the second mesh lines 201 of the electromagnetic touch electrode 6 are intersected with each other in areas close to the first gaps 5, such that the capacitance touch electrode 17 and the electromagnetic touch electrode 6 can control or induce a wide range of areas, and a blank area without the touch electrode is reduced, thereby the touch accuracy is increased. For example, two adjacent first gaps 5 are not located in a straight line so that the first mesh lines of the capacitive touch electrode 17 are intersected with the second mesh lines 201 of the electromagnetic touch electrode 6, which increases the touch accuracy.

For example, the following points A1, A2, A3, A4 are the endpoints of the four first mesh lines 101, and B1, B2, B3, B4 are the endpoints of the four second mesh lines 201, respectively. For example, in FIG. 2F, the first gap 5 between the point A1 and the point B1 and the first gap 5 between the point A3 and the point B3 are located on a straight line in the first direction; the first gap 5 between the point A2 and the point B2 and the first gap 5 between the point A4 and the point B4 are located in another straight line along the first direction. For example, in FIG. 2E, all the first gaps 5 are arranged according to this regulation, that is, the plurality of the first gaps 5 in odd columns are on a straight line parallel to the first direction; and the plurality of the first gaps 5 in even columns are on another straight line parallel to the first direction.

For example, as illustrated in FIG. 2E and FIG. 2F, the plurality of the first mesh lines 101 and the plurality of the second mesh lines 201 are straight line segments, an extension line of each of the plurality of the second mesh lines 201 is extended across one of the plurality of the first gaps 5 and coincides with one of the plurality of the first mesh lines 101. In other words, for example, in FIG. 2F, the point A1 is on a same line as the point B1, the point A2 is on a same line as the point B2, the point A3 is on a same line as the point B3, and the point A4 is on a same line as the point B4 ... and so on. The pattern can make the pattern of the capacitive touch electrodes 17 and the pattern of electromagnetic touch electrodes 6 uniformly arranged as a whole, which is beneficial to the uniformity of light emitted from the display panel, which reduces or avoids a display defect, such as a Mura defect caused by uneven transmission of light in the first touch electrode layer 10.

Figure 2G:
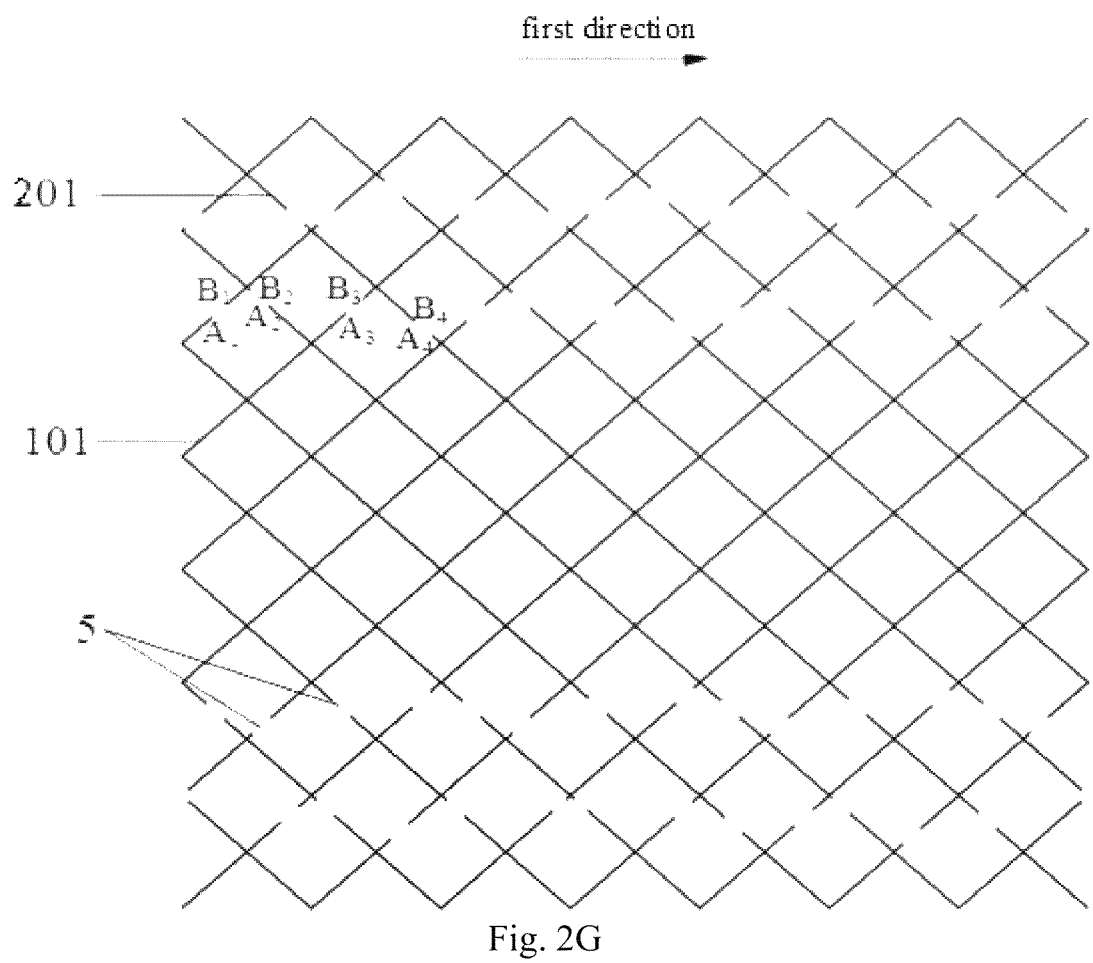
FIG. 2G is another partial enlargement schematic diagram of FIG. 2E.

Of course, in the embodiment of the present disclosure, the position of each of the first gaps 5 is not limited to the case shown in FIG. 2F. For example, FIG. 2G is another partial enlargement schematic diagram of the portion 7 of the first touch electrode layer FIG. 2E. The difference between the first gaps 5 shown in FIG. 2G and the first gaps 5 shown in FIG. 2F is that the positions of the plurality of the first gaps 5 in FIG. 2G are random. For example, the first gap 5 between the point A1 and the point B1, the first gap 5 between the point A2 and the point B2, the first gap 5 between the point A3 and the point B3 and the first gap 5 between the point A4 and the point B4 are located in four different straight lines along the first direction. Compared with the structure shown in FIG. 2F, the structure shown in FIG. 2G is more conducive to making the capacitance touch electrodes 17 and the electromagnetic touch electrodes 6 control or induce a wide range of areas, thereby the blank area without the touch electrode is reduced, and further the touch accuracy is increased.

Figure 2H:
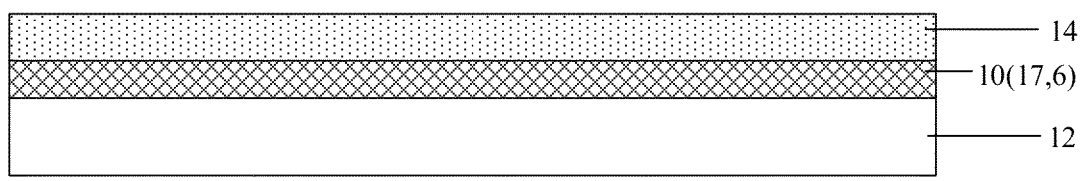
FIG. 2H is a section schematic diagram of a touch panel provided by an embodiment of the present disclosure.

For example, the touch panel provided in an embodiment of the present disclosure comprises only one touch electrode layer, for example, the touch panel comprises any one of the first touch electrode layers shown in FIG. 2A to FIG. 2G, in this situation, the touch panel is a self-capacitive and self-inductance electromagnetic touch panel. FIG. 2A to FIG. 2G are planar schematic diagrams of the touch panel provided in the embodiment of the present disclosure, and FIG. 2H is a section schematic diagram of the touch panel in this situation. As shown in FIG. 2H, the touch panel may further comprise a base substrate 12. For example, the first touch electrode layer 10 is disposed on the base substrate 12, that is the capacitive touch electrode 17 and the electromagnetic touch electrode 6 are disposed on the base substrate 12. The touch panel may further comprise a first protective layer 14 covering the first touch electrode layer 10 to prevent the capacitive touch electrode 17 and the electromagnetic touch electrode 6 from being damaged (for example, abrasion, corrosion, etc.). In the self-capacitive and self-inductance electromagnetic touch panel shown in FIG. 2A to FIG. 2H, the capacitive touch electrode 17 and the electromagnetic touch electrode 6 are disposed in a same layer. The advantages of disposed in a same layer can refer to the descriptions mentioned above. Of course, in the self-capacitive and self-inductance electromagnetic touch panel provided in other embodiments of the present disclosure, the capacitive touch electrode 17 and the electromagnetic touch electrode 6 may also be arranged in different layers.

For example, in the touch panel provided in the embodiment of the present disclosure, the material of the first mesh lines 101 of the capacitive touch electrode 17 and the material of the second mesh lines 201 of the electromagnetic touch electrode 6 may be metallic material, for example, metals such as Al, Cu, Ag, Mo or alloys of at least two of Al, Cu, Ag, Mo. For example, the material of the first protective layer 14 is an insulating material to prevent the operation of the capacitive touch electrode 17 and the electromagnetic touch electrode 6 from being interfered with external electrical signals. For example, the first protective layer 14 is made of transparent material as required, for example, in a case that the touch panel is used in a display panel. For example, the first protective layer 14 is made of transparent inorganic material (silicon oxide, silicon nitride or silicon oxynitride, etc.), or made of organic insulating material, such as resin material. For example, the first protective layer 14 is made of transparent resin, such as polypropylene, polyimide, etc. Of course, the material of the first mesh lines 101 of the capacitive touch electrode 17, the material of the second mesh lines 201 of the electromagnetic touch electrode 6 and the material of the first protective layer are not limited to the types mentioned above.

For example, the touch panel further comprises a driving device, a touch detection device and a controller. The touch detection device is electrically connected with both the capacitive touch electrode and the electromagnetic touch electrode, and is used for detecting the position of the touch point. The touch detection device may be electrically connected with the driving device or arranged independently. The controller is signal connected (for example electrically connected) with the touch detection device, and the controller may be used for receiving the detection results from the touch detection device.

In a case that the self-capacitive and self-inductance electromagnetic touch panels perform a capacitive touch function, the driving device is configured to emit a capacitive touch scanning signal, and the capacitive touch scanning signal emitted by the driving device is transmitted to the capacitive touch electrode. For example, in a case that a finger touches the touch panel, the capacitance of the finger is superimposed on the capacitance of the touch electrode, in this way, the capacitance of the touch electrode changes, and the touch detection device detects the change of the capacitance before and after touching, then analyzes and calculates the received information, and converts the information into the position coordinate of the contact point, and then send the position coordinate to the controller. For example, the driving device comprises a capacitive touch driving circuit, and the emitted capacitive touch scanning signal is a driving current signal. For example, the touch detection device comprises a capacitive touch detection circuit.

In a case that the self-capacitive and self-inductance electromagnetic touch panels perform the electromagnetic induction touch function, the driving device is configured to emit an electromagnetic touch scanning signal, and the electromagnetic touch scanning signal emitted by the driving device is transmitted to the electromagnetic touch electrode. The electromagnetic touch electrode sends out a first electromagnetic signal under an action of the electromagnetic touch scanning signal. For example, in a case that an electromagnetic pen touches a capacitive screen, an oscillating circuit in the electromagnetic pen senses the first electromagnetic signal emitted by an electromagnetic touch electrode located in a touch position and resonate to produce a second electromagnetic signal. The electromagnetic touch electrode receives the second electromagnetic signal and generates an electromagnetic induction signal. The touch detecting device detects the second electromagnetic signal, then analyzes and calculates the received information, and converts the information into the position coordinate of the contact point, and then send the position coordinate to the controller. For example, the driving device comprises an electromagnetic induction touch driving circuit, and an electromagnetic touch scanning signal emitted by the electromagnetic induction touch driving circuit is an exciting current. For example, the touch detection device includes an electromagnetic induction touch detection circuit.

In a case that the touch panel is used in a touch display device, the controller may be a processor of the touch display device (such as a CPU, etc.), and the controller may further control the driving device to perform the corresponding operation.

Figure 3A:
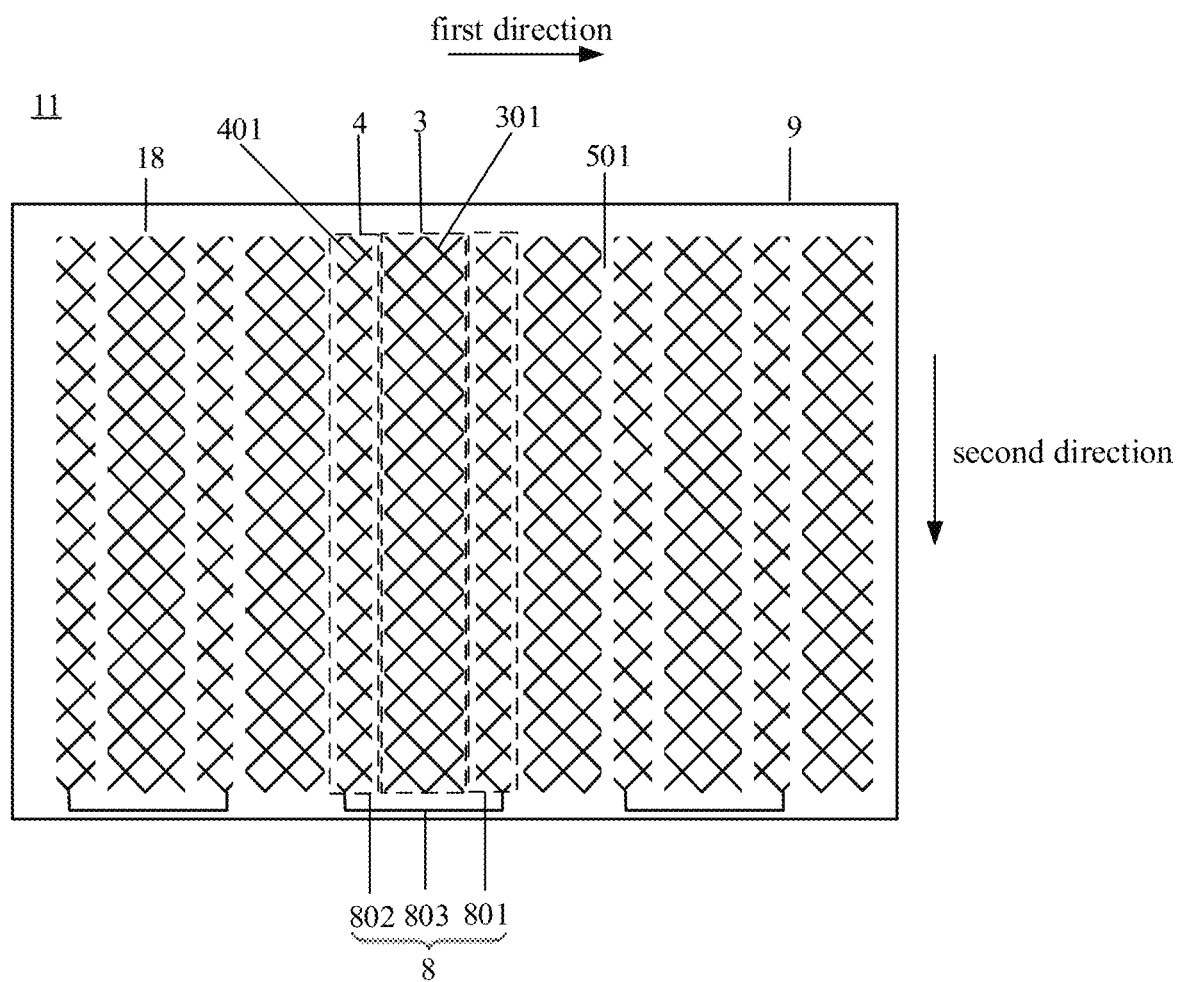
FIG. 3A is a planar schematic diagram of a second touch electrode layer of a touch panel provided by an embodiment of the present disclosure.

The touch panel provided by another embodiment of the present disclosure may also be a mutual capacitance and a mutual inductance electromagnetic type touch panel. In addition to the first touch electrode layer, the touch panel further comprises a second touch electrode layer. For example, FIG. 3A is a planar schematic diagram of a second touch electrode layer of a touch panel provided by an embodiment of the present disclosure. For example, as shown in FIG. 3A, the touch panel provided in another embodiment of the present disclosure further comprises another capacitive touch electrode 18 and another electromagnetic touch electrode 8. For example, the another capacitive touch electrode 18 and the another electromagnetic touch electrode 8 are arranged in a same layer, both the another capacitive touch electrode 18 and the another electromagnetic touch electrode 8 are in the second touch electrode layer 11. In this embodiment, the touch panel is a mutual capacitance and a mutual inductance electromagnetic type touch panel. The another capacitive touch electrode 18 comprises a third mesh pattern 3, and the third mesh pattern 3 comprises a plurality of third mesh lines 301 which are intersected with each other; the another electromagnetic touch electrode 8 comprises a fourth mesh pattern 4, and the fourth mesh pattern 4 comprises a plurality of fourth mesh lines 401 which are intersected with each other. The another capacitive touch electrode 18 is insulated from the another electromagnetic touch electrode 8, and both the another capacitive touch electrode 18 and the another electromagnetic touch electrode 8 are insulated from the capacitive touch electrode 17 and the electromagnetic touch electrode 6.

For example, the third mesh pattern 3 and the fourth mesh pattern 4 are arranged in a same layer, and both the third mesh pattern 3 and the fourth mesh pattern 4 are extended along the second direction which is intersected with the first direction, and the third mesh pattern 3 and the fourth mesh pattern 4 are spaced apart from each other. For example, the second direction is perpendicular to the first direction, so that the coordinates of the touch position can be calculated while the touch panel is working. For example, the plurality of the third mesh lines 301 and the plurality of the fourth mesh lines 401 are spaced apart from each other by a plurality of second gaps 501 to separate the third mesh pattern 3 from the fourth mesh pattern 4; and the plurality of the second gaps 501 are along the second direction and located on a same straight line parallel to the second direction to facilitate patterning. That is, as shown in FIG. 3A, a gap in a strip shape as a whole and composed of the plurality of second gaps 501 is between the third mesh lines 301 and the fourth mesh lines 401 to make the third mesh pattern 3 and the fourth mesh pattern 4 spaced apart from each other and to insulate the another capacitive touch electrode 18 from the another electromagnetic touch electrode 8. In the embodiment shown in FIG. 3A, the gap composed of the plurality of the second gaps 501 is in a linear shape. Of course, in other embodiments of the present disclosure, the gap composed of the plurality of the second gaps 501 is in a curved shape, such as a zigzag or a wavy, etc., which are not limited in the embodiments of the present disclosure. The other features of the second gaps 501 are the same as those of the first gaps 5, which can refer to the descriptions mentioned above, which are omitted herein.

For example, the another electromagnetic touch electrode 8 comprises a first portion 801, a second portion 802 and a connection line 803, and the first portion 801 of the another electromagnetic touch electrode 8 is electrically connected with the second portion 802 of the another electromagnetic touch electrode 8 by the connection line 803 of the another electromagnetic touch electrode 8 to form an electromagnetic induction coil. And both the first portion 801 of the another electromagnetic touch electrode 8 and the second portion 802 of the another electromagnetic touch electrode 8 comprise a fourth mesh pattern 4 and extend along the second direction as shown in FIG. 3A, and the third mesh pattern 3 is located between the first portion 801 of the another electromagnetic touch electrode 8 and the second portion 802 of the another electromagnetic touch electrode 8. In other words, in the embodiment shown in FIG. 3A, the second gaps 501 are not only between the another capacitive touch electrode 18 and the first portion 801 of the another electromagnetic touch electrode 8, but also between the another capacitive touch electrode 18 and the second portion 802 of the another electromagnetic touch electrode 8 to insulate the another capacitive touch electrode 18 from the another electromagnetic touch electrode 8.

As shown in FIG. 3A, the third mesh pattern 3 and the second mesh pattern 4 are constructed in a same manner as that of the first mesh pattern 1 and the second mesh pattern 2 shown in FIG. 2A, which may refer to the above descriptions of the construction of the first mesh pattern 1 and the second mesh pattern 2 shown in FIG. 2A, which are omitted herein. Thus, in a case that the first touch electrode layer 20 and the second touch electrode layer are stacked in the touch panel, a portion of the third mesh lines 301 and a portion of the fourth mesh lines 401 overlap a portion of the first mesh lines 101 and a portion of the second mesh lines 201.

Figure 3B:
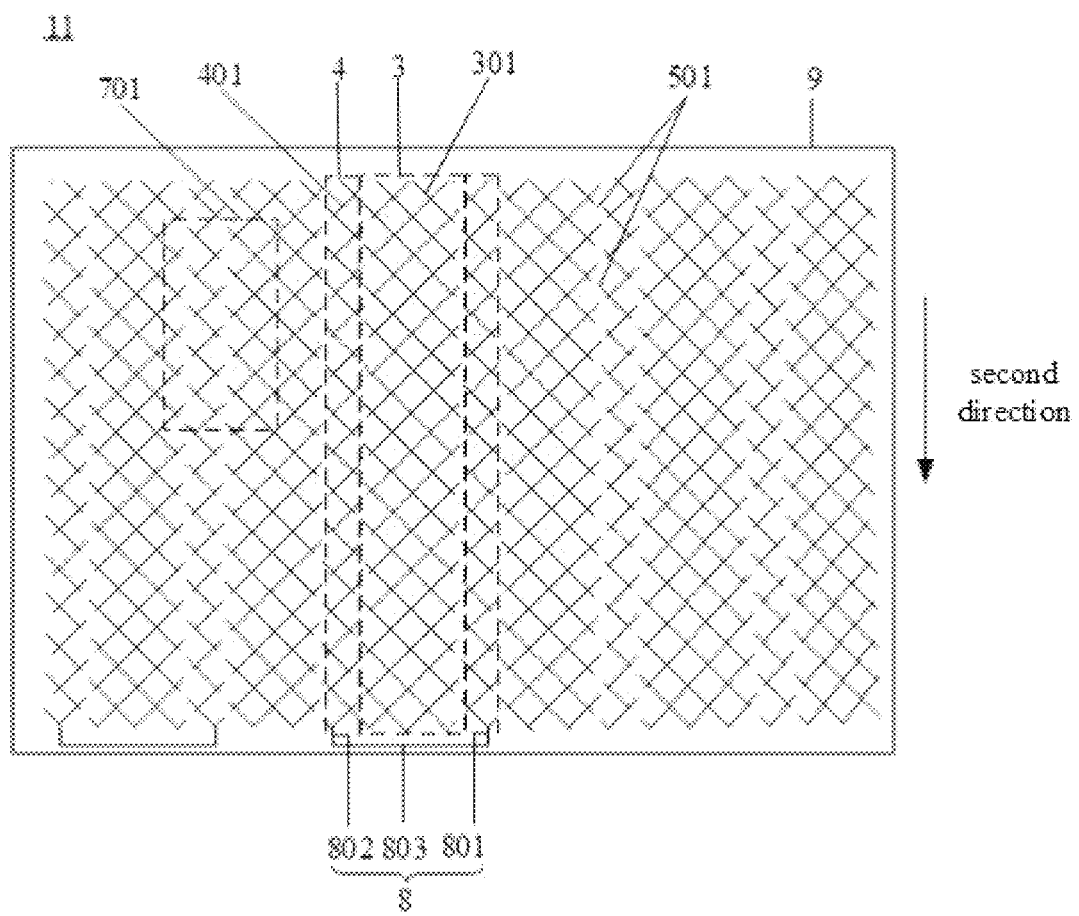
FIG. 3B is another planar schematic diagram of a second touch electrode layer of a touch panel provided by an embodiment of the present disclosure.
Figure 3C:
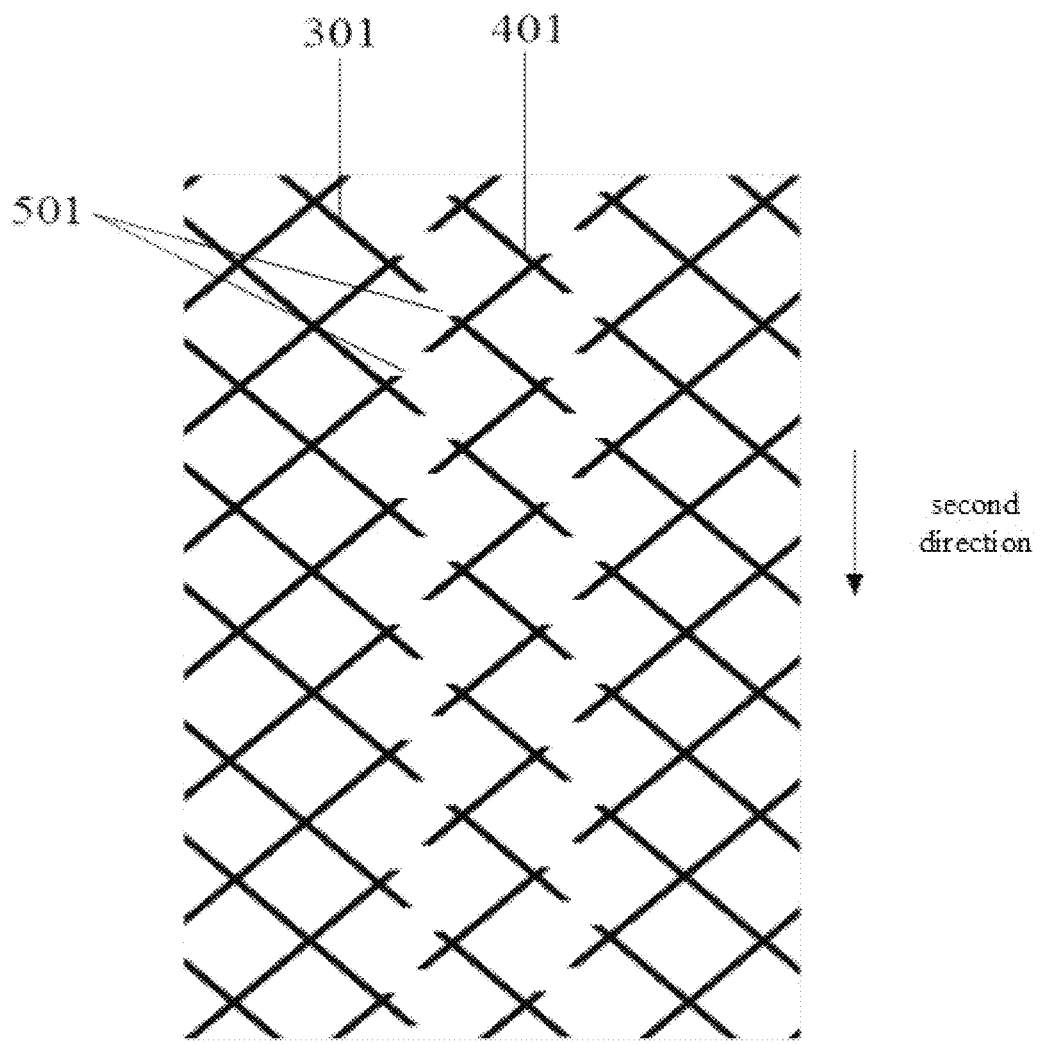
FIG. 3C is a partial enlargement schematic diagram of FIG. 3B.

FIG. 3B is another planar schematic diagram of a second touch electrode layer of a touch panel provided by an embodiment of the present disclosure, and FIG. 3C is a partial enlargement schematic diagram of a portion 701 of the second touch electrode layer in FIG. 3B. The third mesh pattern 3 and the fourth mesh pattern 4 shown in FIG. 3B and FIG. 3C are constructed in a same manner as that of the first mesh pattern 1 and the second mesh pattern 2 shown in FIG. 2E and FIG. 2F. The construction of the third mesh pattern 3 and the fourth mesh pattern 4 shown in FIG. 3B and FIG. 3C differs from the construction of the third mesh pattern 3 and the fourth mesh pattern 4 shown in FIG. 3A in that the plurality of the third mesh lines 301 and the plurality of the fourth mesh lines 401 are spaced apart from each other by a plurality of second gaps 501 which are spaced apart from each other to separate the third mesh pattern 3 from the fourth mesh pattern 4; and the plurality of the second gaps 501 are along the second direction and located on a plurality of straight lines parallel to the second direction respectively. That is, the plurality of the second gaps 501 are not located in a same straight line. Comparing with the case that the third mesh pattern 3 is spaced apart from the fourth mesh pattern 4 by a whole linear gap (the embodiment shown in FIG. 3A), the third mesh pattern 3 of the another capacitive touch electrode 18 and the fourth mesh pattern 4 of the another electromagnetic touch electrode 6 are intersected with each other in areas around the second gaps 501, such that the another capacitance touch electrode 18 and the another electromagnetic touch electrode 8 can control or induce a wide range of areas, and a blank area without the touch electrode is reduced, thereby the touch accuracy is increased.

Figure 3D:
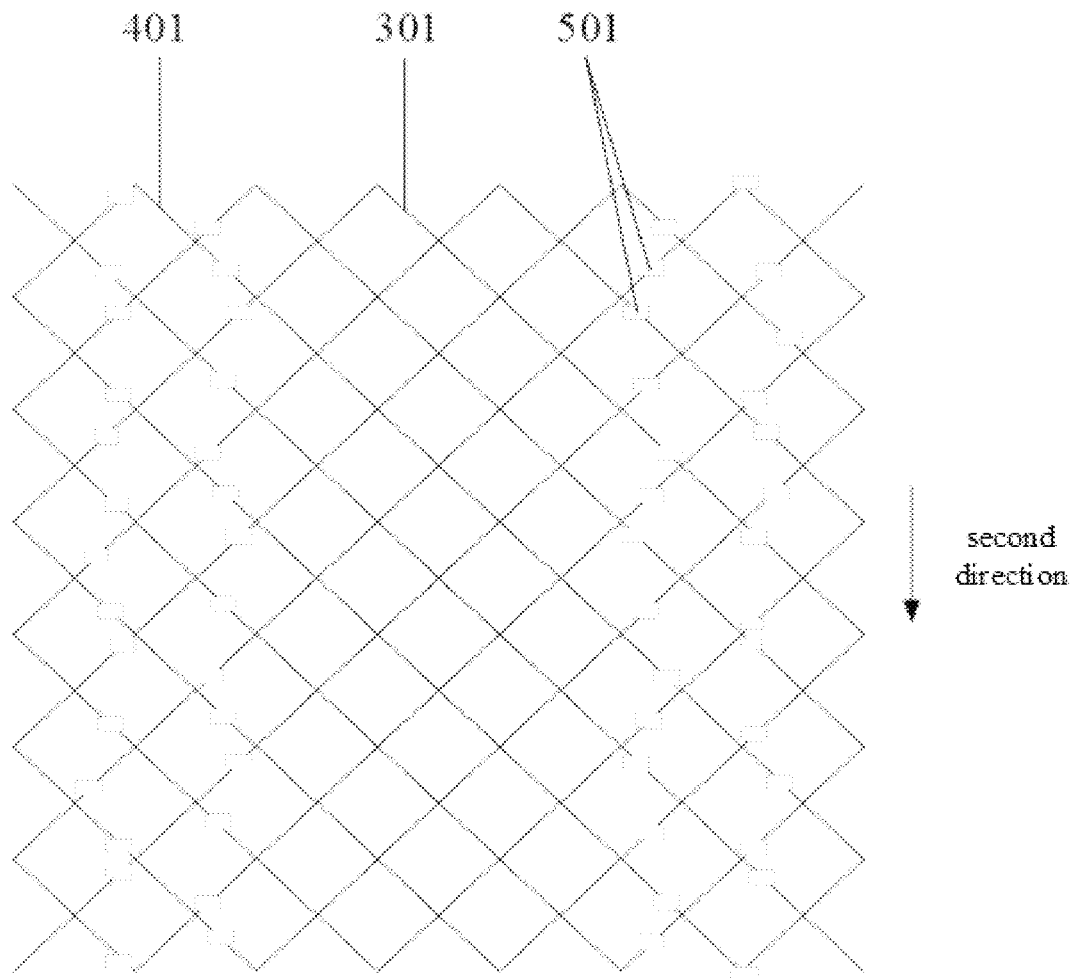
FIG. 3D is another partial enlargement schematic diagram of FIG. 3B.

For example, FIG. 3D is another partial enlargement schematic diagram of the portion 701 of the second touch electrode layer in FIG. 3B. The third mesh pattern 3 and the fourth mesh pattern 4 shown in FIG. 3D are constructed in a same manner as the first mesh pattern 1 and the second mesh pattern 2 shown in FIG. 2G. The difference between the second gaps 501 shown in FIG. 3D and the second gaps 501 shown in FIG. 3C is that the positions of the plurality of the second gaps 501 in FIG. 3D are random. Compared with the structure shown in FIG. 3C, the structure shown in FIG. 3D is more conducive to making the capacitance touch electrode and the electromagnetic touch electrode control or induce a wide range of areas, thereby the blank area without the touch electrode is reduced, and further the touch accuracy is increased.

Figure 4A:
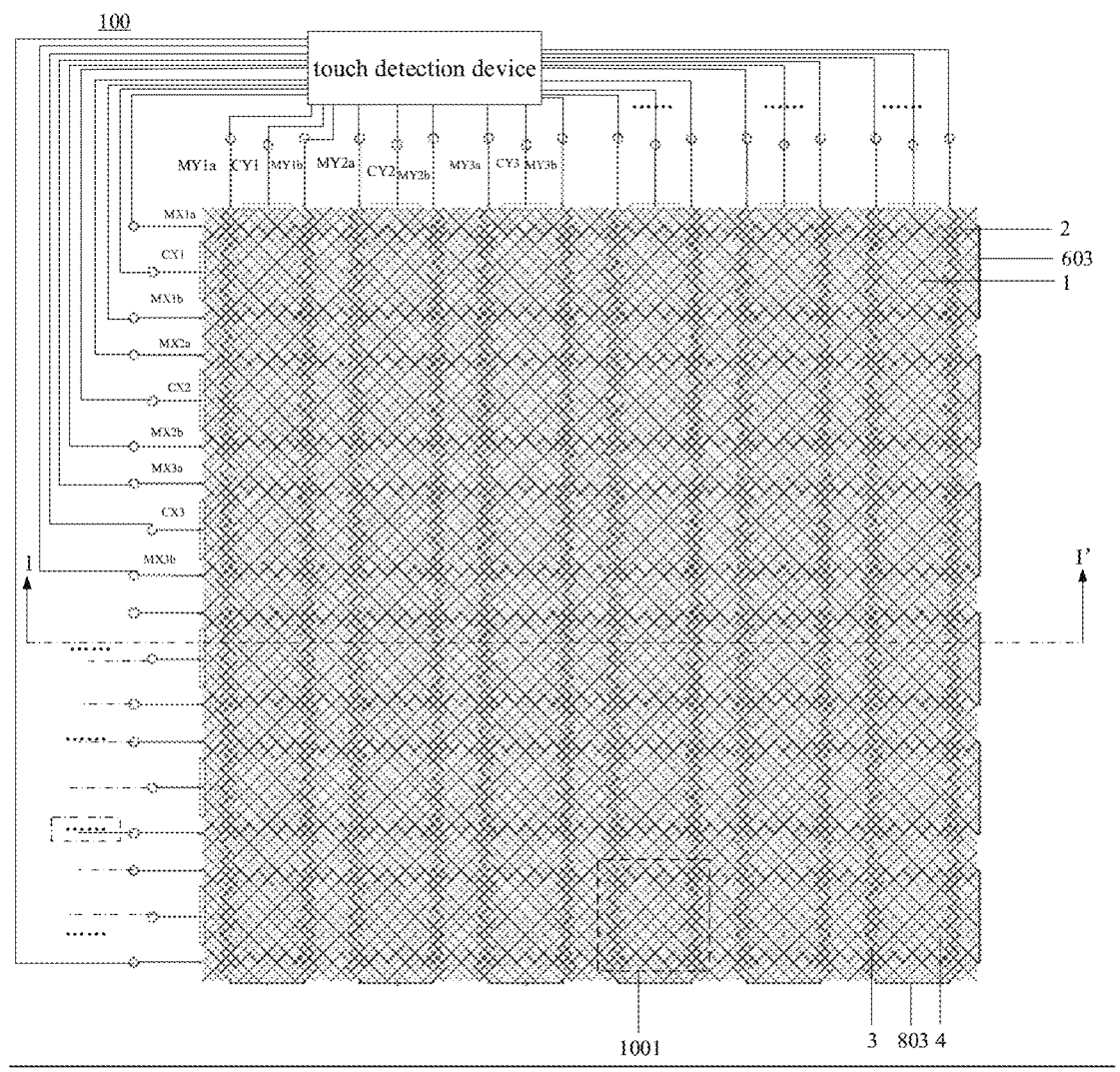
FIG. 4A is a planar schematic diagram of a touch panel provided by an embodiment of the present disclosure.
Figure 4B:
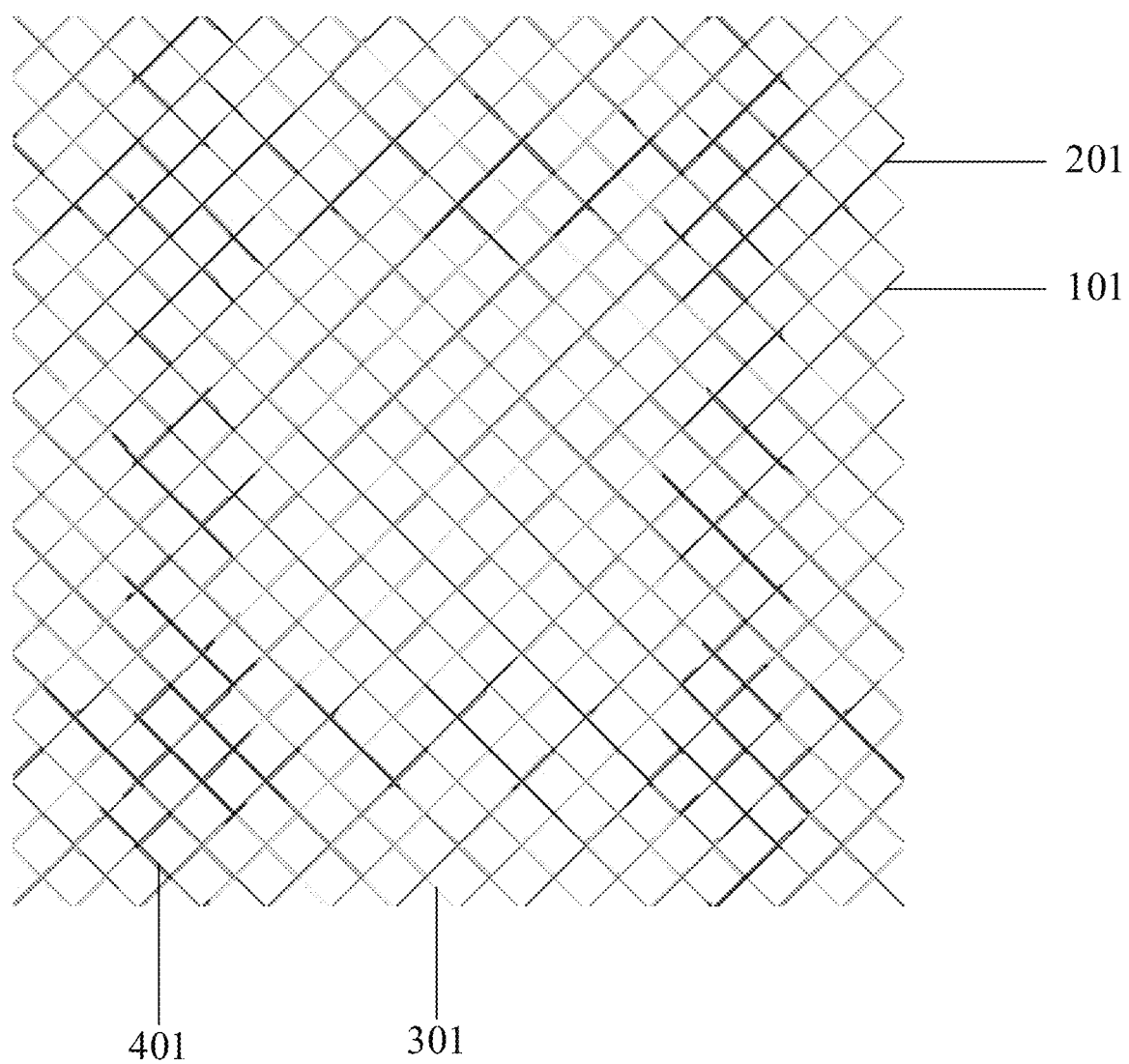
FIG. 4B is a partial enlargement schematic diagram of FIG. 4A.

Exemplarily, FIG. 4A is a planar schematic diagram of a touch panel provided by an embodiment of the present disclosure, and FIG. 4B is a partial enlargement schematic diagram of a portion 1001 of the touch panel 100 in FIG. 4A. For example, as shown in FIG. 4A and FIG. 4B, in the touch panel 100, a layer where the first mesh pattern 1 and the second mesh pattern 2 are located (for example, the first touch electrode layer) and a layer where the third mesh pattern 3 and the fourth mesh pattern 4 are located (for example, the second touch electrode layer) are arranged in a stacked manner. Further, in a direction perpendicular to the layer where the first mesh pattern 1 and the second mesh pattern 2 are located and the layer where the third mesh pattern 3 and the fourth mesh pattern 4 are located, a portion of the third mesh lines 301 and a portion of the fourth mesh lines 401 overlap a portion of the first mesh lines 101 and a portion of the second mesh lines 201. For example, in the present embodiment, it is possible to make the third mesh lines 301 and the fourth mesh lines 401 overlap with the first mesh lines 101 and the second mesh lines 201 as much as possible, in a case that the touch panel is used in the display panel, it is beneficial to increase an area of the light transmissive area of the touch panel and increase the transmittance of light.

It should be noted that, other features of the another capacitive touch electrode and the another electromagnetic touch electrode, such as, materials of the another capacitive touch electrode and the another electromagnetic touch electrode, a shape of a smallest unit of the mesh pattern, and sizes of the second gaps, are the same as those of the capacitive touch electrode and the electromagnetic touch electrode, which can refer to the descriptions mentioned above.

The touch panel 100 further comprises a driving device, a touch detection device and a controller. The touch detection device is electrically connected with both the capacitive touch electrode and the electromagnetic touch electrode, and is used for detecting the positions of the touch points. The touch detection device may be electrically connected with the driving device or arranged independently. For example, as shown in FIG. 4A, the touch detection device (not shown in FIG. 4A) is electrically connected with the plurality of the capacitive touch electrodes of the first touch electrode layer through terminals CX1, CX2, CX3 . . . , respectively, and the touch detection device is electrically connected with the plurality of the another capacitive touch electrodes of the second touch electrode layer through terminals CY1, CY2, CY3 . . . , respectively. The touch detection device is electrically connected with the plurality of the electromagnetic touch electrodes of the first touch electrode layer through terminals MX1a/MX1b, MX2a/MX2b, MX3a/MX3b . . . , respectively, and the touch detection device is electrically connected with the plurality of the another electromagnetic touch electrodes of the second touch electrode layer through terminals MY1a/MY1b, MY2a/MY2b, MY3a/MY3b . . . , respectively. The controller (not shown in FIG. 4A) is signal connected (for example electrically connected) with the touch detection device, and the controller may be used for receiving the detection results from the touch detection device.

In a case that the mutual capacitance and the mutual inductance electromagnetic type touch panel provided by the embodiments of the present disclosure performs the capacitive touch function, the driving device is configured to emit a capacitive touch scanning signal, and the capacitive touch scanning signal emitted by the driving device is transmitted to each of the capacitive touch electrodes by the terminals CX1, CX2, CX3, . . . , respectively; and the capacitive touch scanning signal emitted by the driving device is transmitted to each of the another capacitive touch electrodes by the terminals CY1, CY2, CY3, . . . respectively. The plurality of the capacitive touch electrodes and the plurality of the another capacitive touch electrodes can form mutual capacitance at the overlaps. In a case that a finger touches the touch panel 100, which affects the coupling of the capacitance around the touch point, thereby the capacitance of the capacitor around the touch point is changed. The touch detection device detects the change of the capacitance before and after touching, then analyzes and calculates the received information, and converts the information into the position coordinate of the contact point, and then send the position coordinate to the controller. For example, a coordinate of the touch position in the first direction is determined by a signal from the capacitive touch electrode extending in the first direction, and a coordinate of the touch position in the second direction is determined by a signal from the another capacitive touch electrode extending in the second direction to determine where the touch is occurred. For example, the driving device comprises the capacitive touch driving circuit, and the emitted capacitive touch scanning signal is the driving current signal. For example, the touch detection device comprises the capacitive touch detection circuit.

In a case that the mutual capacitance and the mutual inductance electromagnetic type touch panel provided by the embodiments of the present disclosure performs the electromagnetic induction touch function, the driving device is configured to emit an electromagnetic touch scanning signal, and the electromagnetic touch scanning signal emitted by the driving device is transmitted to each of the electromagnetic touch electrodes of the first touch electrode layer by the terminals MX1a, MX2a, MX3a, . . . , respectively; and the electromagnetic touch electrodes emit driving electromagnetic signals under the action of the electromagnetic touch scanning signal; and the electromagnetic touch scanning signal emitted by the driving device is transmitted to each of the another electromagnetic touch electrodes of the second touch electrode layer by the terminals MY1a, MY2a, MY3a, . . . , respectively. The another electromagnetic touch electrode emits another driving electromagnetic signal under the action of the electromagnetic touch scanning signal. The driving electromagnetic signal and the another driving electromagnetic signal are superimposed to form a first electromagnetic signal. For example, in a case that the electromagnetic pen touches the capacitive screen, the oscillating circuit in the electromagnetic pen senses the first electromagnetic signal at the touch position and resonates to generate the second electromagnetic signal. The electromagnetic touch electrode and the another electromagnetic touch electrode located at the touch position receive the second electromagnetic signal and generate electromagnetic induction signals respectively. The touch detection device can detect the electromagnetic induction signals from the electromagnetic touch electrode and the another electromagnetic touch electrode located at the touch position, then analyzes and calculates the received information, and converts the information into the position coordinate of the contact point, and then send the position coordinate to the controller. For example, a coordinate of the touch position in the first direction is determined by an electromagnetic induction signal from the electromagnetic touch electrode extending in the first direction, and a coordinate of the touch position in the second direction is determined by an electromagnetic induction signal from the another electromagnetic touch electrode extending in the second direction to determine where the touch is occurred. For example, the driving device comprises the electromagnetic induction touch driving circuit, and the emitted electromagnetic touch scanning signal is an excitation current. For example, the touch detection device comprises the electromagnetic induction touch detection circuit.

In a case that the touch panel is used in a touch display device, the controller may be a processor of the touch display device (such as a CPU, etc.), and the controller may further control the driving device to perform the corresponding operation.

Figure 5A:
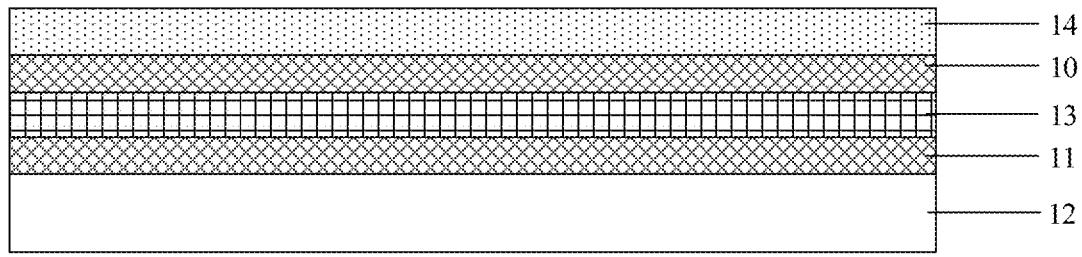
FIG. 5A is a section schematic diagram along an I-I' line of FIG. 4A.

FIG. 5A is a section schematic diagram along an I-I' line of FIG. 4A. As shown in FIG. 5A, the touch panel further comprises a base substrate 12 and an insulating layer 13, and the first touch electrode layer 10 and the second touch electrode layer 11 are arranged on a same side of the base substrate 12, that is, the first mesh pattern, the second mesh pattern, the third mesh pattern and the fourth mesh pattern are arranged on a same side of the base substrate 12. The insulating layer 13 is arranged between the layer where the first mesh pattern and the second mesh pattern are located (the first touch electrode layer 10) and the layer where the third mesh pattern and the fourth mesh pattern (the second touch electrode layer 11) are located. The touch panel may further comprise a first protective layer 14 covering the first touch electrode layer 10 to prevent the capacitive touch electrode and the electromagnetic touch electrode from being damaged (for example, abrasion, corrosion, etc.). The material of the first protective layer 14 is referred to the above-mentioned descriptions.

Figure 5B:
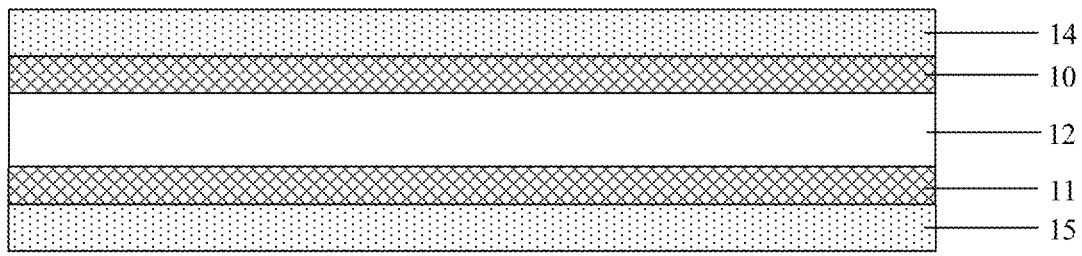
FIG. 5B is another section schematic diagram along an I-I' line of FIG. 4A.

FIG. 5B is another section schematic diagram along an I-I' line of FIG. 4A. In the touch panel shown in FIG. 5B, the first touch electrode layer 10 is arranged on a first side of the base substrate 12, the second touch electrode layer 11 is arranged on a second side of the base substrate 12, and the second side is opposite to the first side. That is, the first mesh pattern and the second mesh pattern are arranged on the first side of the base substrate 12, and the third mesh pattern and the fourth mesh pattern are arranged on the second side of the base substrate 12. For example, the touch panel may further comprise a second protective layer 15 covering the second touch electrode layer 11 to prevent the another capacitive touch electrode 18 and the another electromagnetic touch electrode 8 from being damaged (for example, abrasion, corrosion, etc.). The material of the second protective layer 15 may be the same as the material of the first protective layer, which can refer to the above-mentioned descriptions.

Figure 5C:
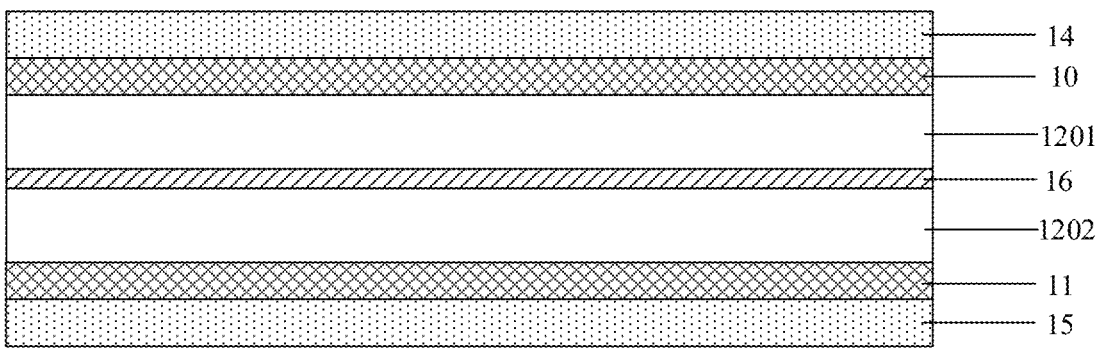
FIG. 5C is still another section schematic diagram along an I-I' line of FIG. 4A.

FIG. 5C is another section schematic diagram along an I-I' line of FIG. 4A. In the embodiment shown in FIG. 5C, the touch panel comprises a first base substrate 1201 and a second base substrate 1202 which are opposite to each other. The first touch electrode layer 10 is arranged on the first base substrate 1201. The second touch electrode layer 11 is arranged on the second base substrate 1202. That is, the first mesh pattern 1 and the second mesh pattern 2 are arranged on the first base substrate 1201, and the third mesh pattern 3 and the fourth mesh pattern 4 are arranged on the second base substrate 1202. For example, the touch panel further comprises an adhesive layer 16 for bonding the first substrate 1201 and the second substrate 1202. For example, the adhesive layer 16 is made of adhesive glue. The other features of the touch panel shown in FIG. 5C are the same as that shown in FIG. 5B, which are omitted herein.

It should be noted that, there may be other layers existing between the different layers shown in FIG. 5A to FIG. 5C according to actual requirements. For example, in a case that the touch panel provided by the embodiment of the present disclosure is used in a display device, a display layer (for example, a liquid crystal layer, an organic light-emitting display device layer, a display driving circuit layer, a substrate, etc.) is arranged between different layers, to form different types of the touch display panels, such as an on-cell type touch display panel or an in-cell type touch display panel or an OGS (One Glass Solution) type touch display panel.

At least one embodiment of the present disclosure further provides a touch display panel, and the touch display panel includes any one of the touch panels provided by the embodiments of the present disclosure. The touch display panel provided by the embodiment of the present disclosure can realize both the capacitive touch and the electromagnetic induction touch at the same time. In addition, it can ensure a high capacitance touch accuracy, a high electromagnetic touch accuracy and a high touch sensitivity while ensuring a high transmittance.

Figure 6:
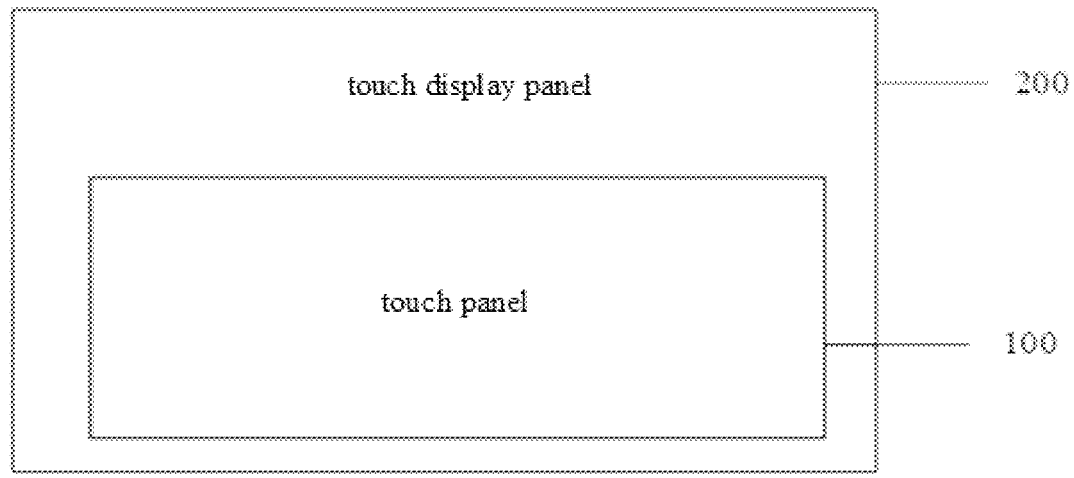
FIG. 6 is a schematic diagram of a display panel provided by an embodiment of the present disclosure.

Exemplarily, FIG. 6 is a schematic diagram of a display panel provided by an embodiment of the present disclosure. As shown in FIG. 6, the touch display panel 200 comprises any one of the touch panels 100 provided by the embodiments of the present disclosure. Different types of the touch display panels, such as the on-cell type touch display panel or the in-cell type touch display panel or the OGS type touch display panel can be formed according to requirements. For example, the touch display panel 200 may be a liquid crystal display panel, an organic light-emitting diode (OLED) display panel, etc.

Figure 7:
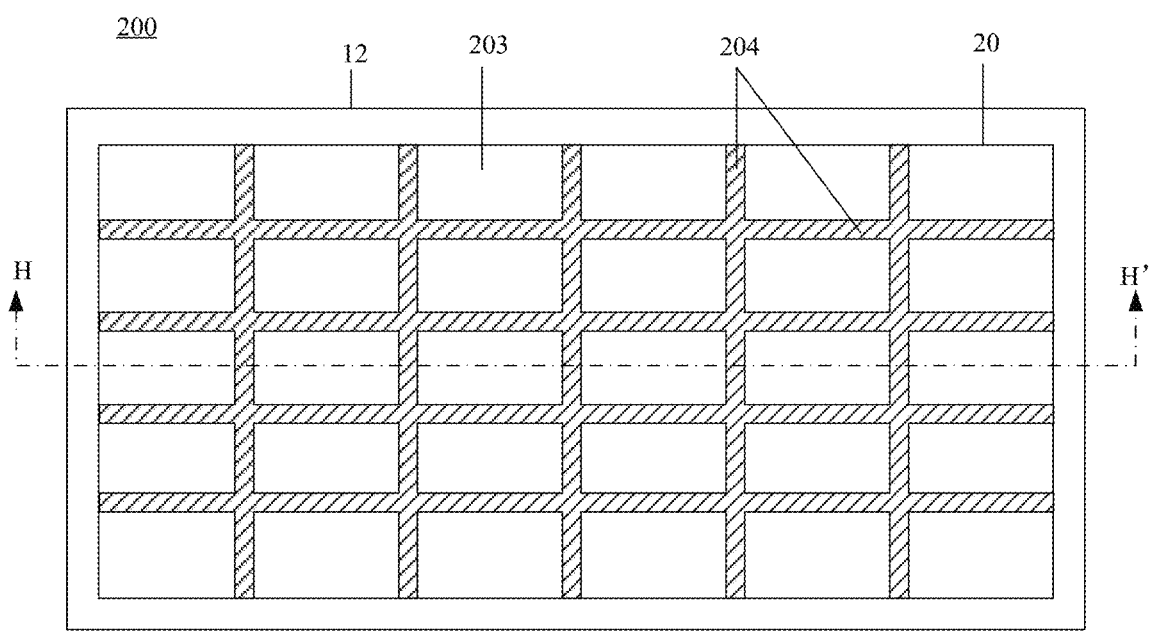
FIG. 7 is a planar schematic diagram of a display panel provided by an embodiment of the present disclosure.
Figure 8A:
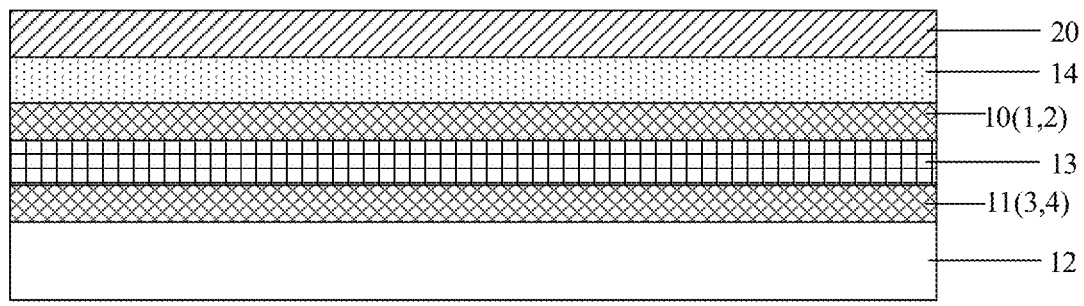
FIG. 8A is a section schematic diagram along an H-H' line of FIG. 7.
Figure 8B:
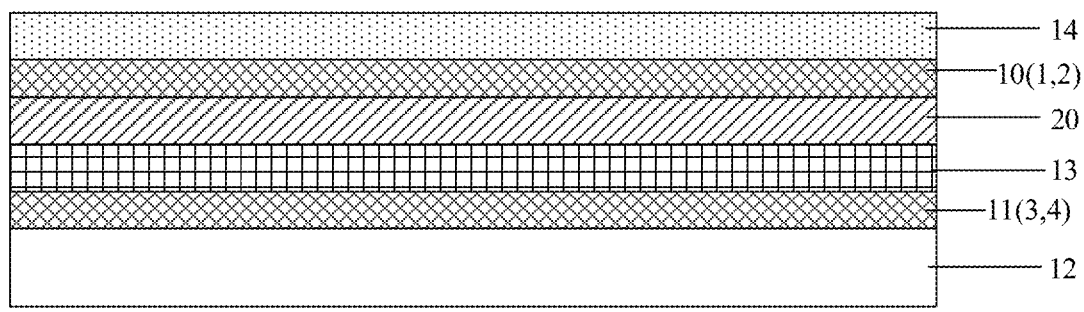
FIG. 8B is another section schematic diagram along an H-H' line of FIG. 7.

For example, FIG. 7 is a planar schematic diagram of a display panel provided by an embodiment of the present disclosure, FIG. 8A is a section schematic diagram along an H-H' line of FIG. 7, and FIG. 8B is another section schematic diagram along an H-H' line of FIG. 7.

As illustrated in FIG. 7 and FIG. 8A, the touch display panel provided by the embodiment of the present disclosure further comprises a display layer 20, and the display layer 20 comprises a plurality of signal lines 204 which are intersected with each other and a plurality of display units 203 located between the signal lines 204. An orthographic projection of at least a portion of the plurality of first mesh lines on the display layer or an orthographic projection of at least a portion of the second mesh line on the display layer intersects with the signal lines 204 and is not perpendicular to the signal lines 204, to reduce or avoid the Mura pattern effect in the display process. For example, as shown in FIG. 7, the signal lines 204 are perpendicular or parallel to a transverse outer contour of the base substrate 12, or perpendicular or parallel to a longitudinal outer contour of the base substrate 12, both the extending direction of the plurality of the first mesh lines 101 and the extending direction of the plurality of the second mesh lines 201 of the touch panel intersect with but are not perpendicular to the transverse outer contour or the longitudinal outer contour of the base substrate 12. As a result, a phase difference between the light passing through the mesh pattern formed by the signal lines 204 and the light passing through the first mesh pattern 1 and the second mesh pattern 2 is large, and the two beams of the light do not tend to form an obvious Mura phenomenon in a case that they interfere with each other. Thus, the touch display panel provided by the embodiment of the present disclosure can achieve a better visual display effect. In a case that the touch display panel comprises a black matrix, for example, in the liquid crystal display panel, the orthographic projection of at least a portion of the first mesh lines 101 on the display layer or the orthographic projection of at least a portion of the second mesh line 201 on the display layer intersects with the black matrix and is not perpendicular to the black matrix. Thus, it is also possible to reduce or avoid the Mura pattern effect in the process of display.

For example, the signal lines may include various types of lines such as gate lines, data lines, power lines, common electrode lines, reset lines, and the like.

For example, as shown in FIG. 8A, the display layer 20 is located on a side of the first touch electrode layer 10 and the second touch electrode layer 11 away from the base substrate 12, that is the display layer 20 is located on a side of the first mesh pattern 1, the second mesh pattern 2, the third mesh pattern 3 and the fourth mesh pattern 4 away from the base substrate 12.

For another example, as shown in FIG. 8B, the display layer 20 is located between the first touch electrode layer 10 and the second touch electrode layer 11. That is, the display layer 20 is located between the layer where the first mesh pattern 1 and the second mesh pattern 2 are located and the layer where the third mesh pattern 3 and the fourth mesh pattern 4 are located.

It should be noted that, in FIG. 8A and FIG. 8B, there may be other layers between the various layers, and the drawings of the present disclosure only show the structure directly related to the layer where the first mesh pattern 1 and the second mesh pattern 2 are located and the layer where the third mesh pattern 3 and the fourth mesh pattern 4 are located.

At least one embodiment of the present disclosure further provides a touch display device, and the touch display device comprises any one of touch display panels provided by the embodiment of the present disclosure. The touch display device provided by the embodiment of the present disclosure can realize both the capacitive touch and the electromagnetic induction touch at the same time. In addition, it can ensure a high capacitance touch accuracy, a high electromagnetic touch accuracy and a high touch sensitivity while ensuring a high transmittance.

Figure 9:
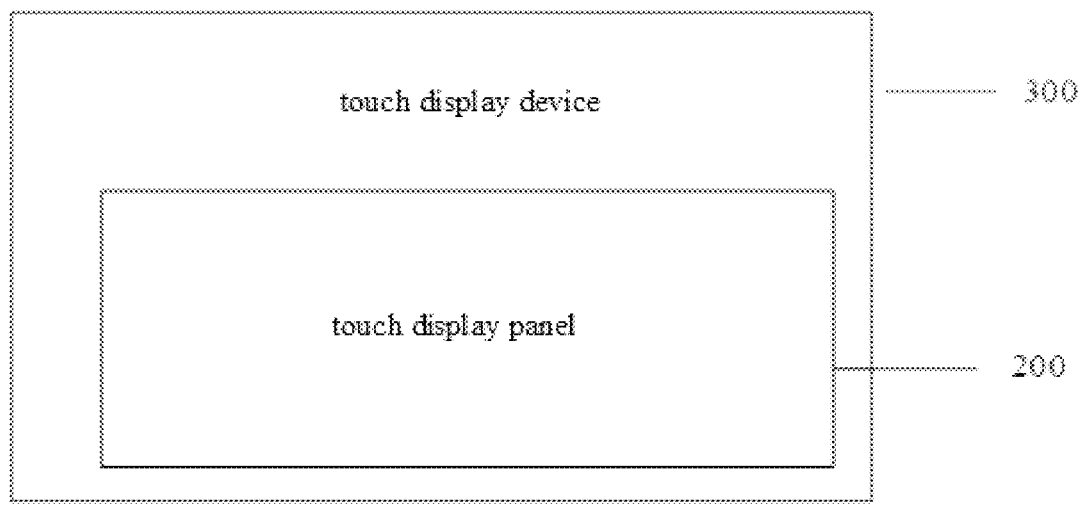
FIG. 9 is a schematic diagram of a display device provided by an embodiment of the present disclosure.

Exemplarily, FIG. 9 is a schematic diagram of a display device provided by an embodiment of the present disclosure. As shown in FIG. 9, the touch display device 300 comprises any one of touch display panels 200 provided by the embodiment of the present disclosure. For example, the touch display device is an organic light-emitting diode display device or a liquid crystal display device and so on, which has the function of the capacitive touch and the function of the electromagnetic induction touch. For example, the display device is any product or component having a display function such as a mobile phone, a tablet computer, a television, a monitor, a notebook computer, a digital photo frame, a navigator, an electronic advertising screen and so on.

The embodiment of the present disclosure further provides a manufacturing method of the touch panel, and the touch panel provided by the embodiment of the present disclosure can be obtained by using the manufacturing method. The method comprises: providing a base substrate, forming a capacitive touch electrode and an electromagnetic touch electrode on the base substrate. The capacitive touch electrode comprises a first mesh pattern, and the first mesh pattern comprises a plurality of first mesh lines which are intersected with each other. The electromagnetic touch electrode is insulated from the capacitive touch electrode and the electromagnetic touch electrode comprises a second mesh pattern, and the second mesh pattern comprises a plurality of second mesh lines which are intersected with each other.

Figure 10A:
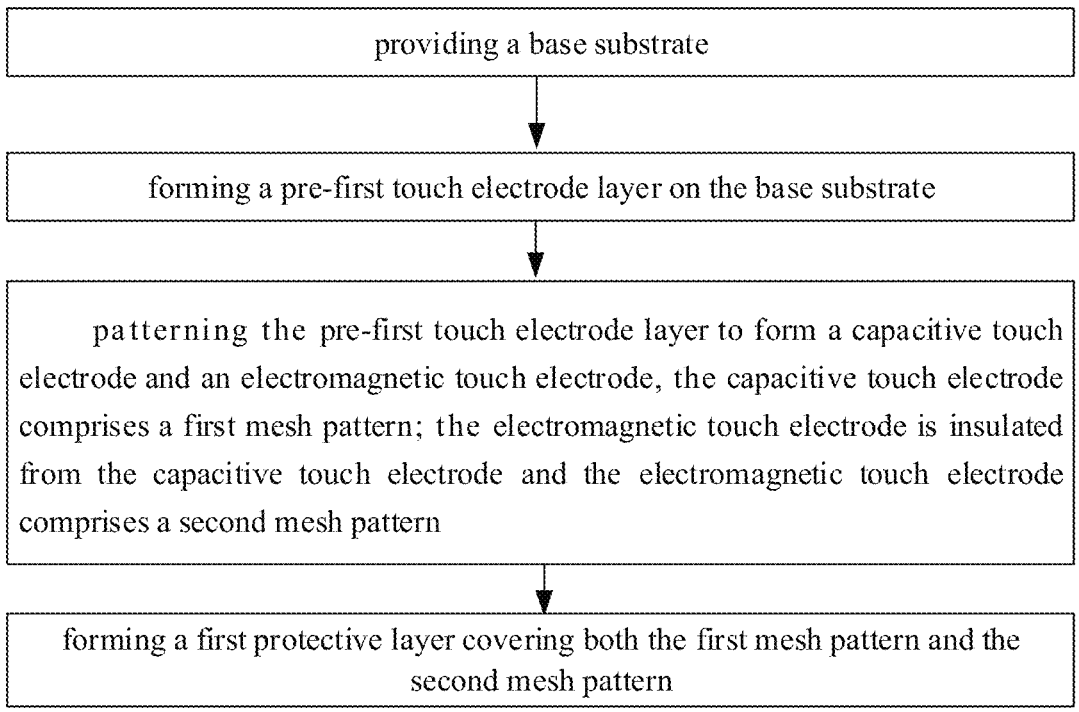
FIG. 10A is a process flowchart of a manufacturing method of a touch panel provided by an embodiment of the present disclosure.

Exemplarily, FIG. 10A is a process flowchart of a manufacturing method of a touch panel provided by an embodiment of the present disclosure. As shown in FIG. 10A, the touch panel is formed by the following processes: providing a base substrate, for example, the base substrate is a quartz substrate, a glass substrate, or a plastic substrate; then forming a pre-first touch electrode layer on the base substrate to form a capacitive touch electrode and an electromagnetic touch electrode. For example, the material of the pre-first touch electrode layer is a metallic material, metals such as Al, Cu, Ag, Mo or alloys. For example, a pre-first touch electrode is formed by a chemical vapor deposition or a magnetron sputtering. The pre-first touch electrode layer is patterned to form a capacitive touch electrode and an electromagnetic touch electrode. The capacitive touch electrode comprises a first mesh pattern, and the first mesh pattern comprises a plurality of first mesh lines which are intersected with each other. The electromagnetic touch electrode is insulated from the capacitive touch electrode and the electromagnetic touch electrode comprises a second mesh pattern, and the second mesh pattern comprises a plurality of second mesh lines which are intersected with each other. For example, the patterning process is photolithography.

For example, the manufacturing method further comprises: forming a first protective layer covering both the first mesh pattern and the second mesh pattern. For example, the material of the first protective layer is referred to the descriptions in the above-mentioned embodiments. According to the material of the first protective layer, those skilled in the art may choose appropriate methods to form the first protective layer, such as a coating method or a depositing method. The specific characteristics of the resulted first mesh pattern and the second mesh pattern are referred to the descriptions in the above-mentioned embodiments. In this way, the touch panel shown in FIG. 2H is obtained.

Figure 10B:
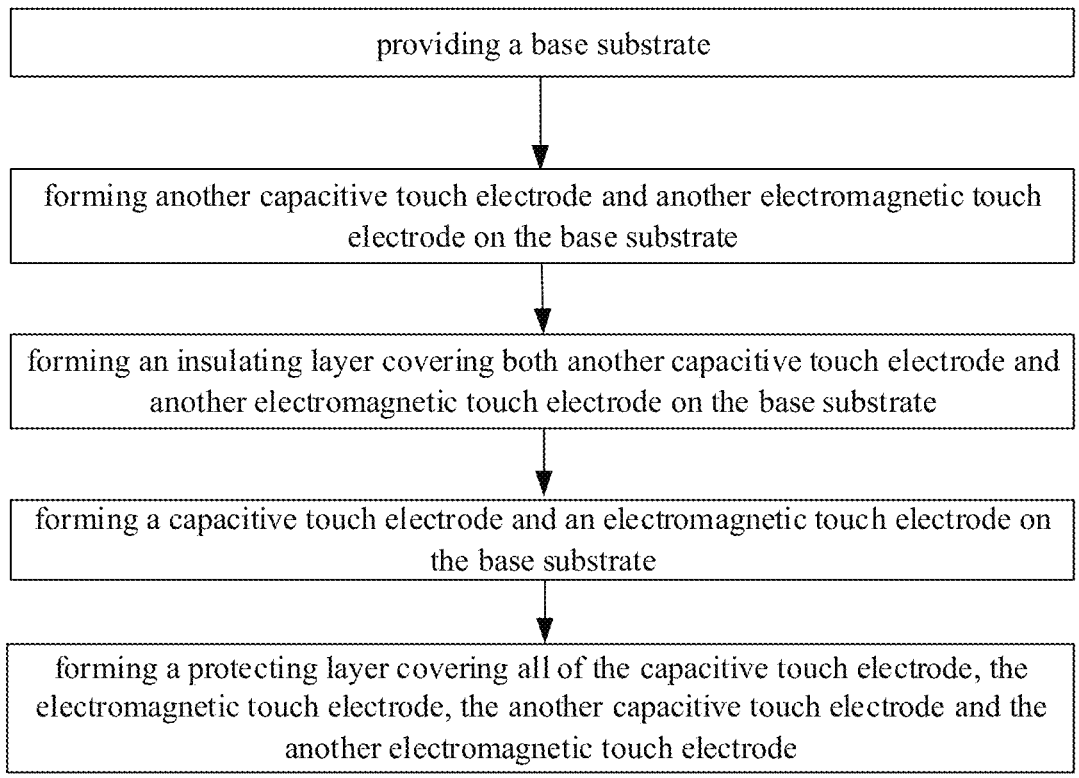
FIG. 10B is a process flowchart of another manufacturing method of a touch panel provided by an embodiment of the present disclosure.

For example, FIG. 10B is a process flowchart of a manufacturing method of another touch panel provided by an embodiment of the present disclosure. As illustrated in FIG. 10B, the method comprises: providing a base substrate; forming another capacitive touch electrode and another electromagnetic touch electrode on the base substrate; forming an insulating layer on the base substrate; forming a capacitive touch electrode and an electromagnetic touch electrode on the base substrate, herein the insulating layer is located between the layer where the capacitive touch electrode and the electromagnetic touch electrode are located and the layer where the another capacitive touch electrode and the another electromagnetic touch electrode are located; and forming a protecting layer covering all of the capacitive touch electrode, the electromagnetic touch electrode, the another capacitive touch electrode and the another electromagnetic touch electrode.

For example, in an example, a pre-second touch electrode layer is formed on the base substrate for forming the another capacitive touch electrode and the another electromagnetic touch electrode. The material of the pre-second touch electrode layer and the specific forming method of the pre-second touch electrode layer are the same as those of the pre-first touch electrode layer. The patterning process is performed on the pre-second touch electrode layer to form the another capacitive touch electrode and the another electromagnetic touch electrode. Then, an insulating layer covering both the another capacitive touch electrode and the another electromagnetic touch electrode is formed on the base substrate. The capacitive touch electrode and the electromagnetic touch electrode are formed on the insulating layer, and the specific method is referred to the descriptions mentioned above. The first protective layer covering both the capacitive touch electrode and the electromagnetic touch electrode is formed, and the specific method is referred to the descriptions mentioned above. Thus, the touch panel shown in FIG. 5A is obtained. The specific structural characteristics of the another capacitive touch electrode and the another electromagnetic touch electrode are referred to the descriptions in the above-mentioned embodiments.

It should be noted that, in another example, the capacitive touch electrode and the electromagnetic touch electrode are formed on the base substrate, and then the another capacitive touch electrode and the another electromagnetic touch electrode are formed. In the obtained touch panel, the another capacitive touch electrode and the another electromagnetic touch electrode are located on a side of the capacitive touch electrode and the electromagnetic touch electrode away from the base substrate.

In another example, two base substrates are provided, which are a first base substrate and a second base substrate. The capacitive touch electrode and the electromagnetic touch electrode are formed on a first surface of the first base substrate, and a first protective layer covering both the capacitive touch electrode and the electromagnetic touch electrode is formed on the first surface of the first base substrate. The another capacitive touch electrode and the another electromagnetic touch electrode are formed on the first surface of the second base substrate, and a second protective layer covering both the another capacitive touch electrode and the another electromagnetic touch electrode is formed on the first surface of the second base substrate. The specific forming method is referred to the descriptions mentioned above. Then, the second surface of the first base substrate opposite to the first surface of the first base substrate and the second surface of the second base substrate opposite to the first surface of the second base substrate are bonded with each other, thus the touch panel shown in FIG. 5C is obtained.

What is described above is related to only the illustrative embodiments of the present disclosure and not limitative to the protection scope of the present application. The protection scope of the present application shall be defined by the accompanying claims.

What is claimed is:

1. A touch panel, comprising:
a capacitive touch electrode, comprising a first mesh pattern, wherein the first mesh pattern comprises a plurality of first mesh lines, and the plurality of the first mesh lines are intersected with each other;
an electromagnetic touch electrode, insulated from the capacitive touch electrode and comprising a second mesh pattern, wherein the second mesh pattern comprises a plurality of second mesh lines, and the plurality of the second mesh lines are intersected with each other;
the first mesh pattern and the second mesh pattern are arranged in a same layer, and both the first mesh pattern and the second mesh pattern are extended along a first direction;
the first mesh pattern and the second mesh pattern are spaced apart from each other to insulate the capacitive touch electrode from the electromagnetic touch electrode; and
the first mesh pattern and the second mesh pattern are configured in such a way that a portion of the second mesh pattern overlaps a portion of the first mesh pattern in condition that the second mesh pattern is translated in a second direction being intersected with the first direction.

2. The touch panel according to claim 1, wherein,
the plurality of the first mesh lines and the plurality of the second mesh lines are spaced apart from each other by a plurality of first gaps, and the plurality of the first gaps are spaced apart from each other to separate the first mesh pattern from the second mesh pattern; and
the plurality of the first gaps are along the first direction and located on a plurality of straight lines parallel to the first direction respectively.

3. The touch panel according to claim 2, wherein the plurality of the first gaps in odd columns are along the first direction and on a straight line parallel to the first direction; and the plurality of the first gaps in even columns are along the first direction and on another straight line parallel to the first direction.

4. The touch panel according to claim 2, wherein all the plurality of the first mesh lines and all the plurality of the second mesh lines are straight line segments, an extension line of each of the plurality of the second mesh lines is extended across one of the plurality of the first gaps and coincides with one of the plurality of the first mesh lines.

5. The touch panel according to claim 1, wherein,
the electromagnetic touch electrode comprises a first portion, a second portion, and a connection line, and the first portion is electrically connected with the second portion by the connection line; and
both the first portion and the second portion comprise the second mesh pattern and extend along the first direction, and the first mesh pattern is located between the first portion and the second portion of the electromagnetic touch electrode.

6. The touch panel according to claim 1, further comprising an outer contour, wherein an extending direction of at least a portion of the plurality of the first mesh lines or an extending direction of at least a portion of the plurality of the second mesh lines intersects with the outer contour and an angle between the extending direction of at least a portion of the plurality of the first mesh lines or the extending direction of at least a portion of the plurality of the second mesh lines and the outer contour is less than 90°.

7. The touch panel according to claim 1, wherein the first mesh pattern comprises a plurality of first mesh units, the plurality of the first mesh units are in a same shape and periodically arranged, and the second mesh pattern comprises a plurality of second mesh units, the plurality of the second mesh units are in a same shape and periodically arranged.

8. The touch panel according to claim 7, wherein both the first mesh units and the second mesh units are in a shape of a diamond, a circle, a parallelogram, or a triangle.

9. The touch panel according to claim 1, further comprising:
another capacitive touch electrode, comprising a third mesh pattern, wherein the third mesh pattern comprises a plurality of third mesh lines, the plurality of the third mesh lines are intersected with each other; and
another electromagnetic touch electrode, comprising a fourth mesh pattern, wherein the fourth mesh pattern comprises a plurality of fourth mesh lines, the plurality of the fourth mesh lines are intersected with each other,
wherein both the another capacitive touch electrode and the another electromagnetic touch electrode are insulated from each of the capacitive touch electrode and the electromagnetic touch electrode.

10. The touch panel according to claim 9, wherein,
the third mesh pattern and the fourth mesh pattern are arranged in a same layer, and both the third mesh pattern and the fourth mesh pattern are extended along the second direction, the second direction is intersected with the first direction, and the third mesh pattern and the fourth mesh pattern are spaced apart from each other;
a layer where the first mesh pattern and the second mesh pattern are located and a layer where the third mesh pattern and the fourth mesh pattern are located are arranged in a stacked manner; and
in a direction perpendicular to the layer where the first mesh pattern and the second mesh pattern are located and the layer where the third mesh pattern and the fourth mesh pattern are located, a portion of the third mesh lines and a portion of the fourth mesh lines overlap a portion of the first mesh lines and a portion of the second mesh lines.

11. The touch panel according to claim 10, wherein
the plurality of the third mesh lines and the plurality of the fourth mesh lines are spaced apart from each other by a plurality of second gaps, the plurality of the second gaps are spaced apart from each other to separate the third mesh pattern from the fourth mesh pattern; and
the plurality of the second gaps are along the second direction and located on a plurality of straight lines parallel to the second direction respectively.

12. The touch panel according to claim 9, further comprising: a base substrate and an insulating layer, wherein the first mesh pattern, the second mesh pattern, the third mesh pattern and the fourth mesh pattern are arranged on a same side of the base substrate; and
the insulating layer is arranged between the layer where the first mesh pattern and the second mesh pattern are located and the layer where the third mesh pattern and the fourth mesh pattern are located.

13. The touch panel according to claim 9, further comprising a base substrate, wherein the first mesh pattern and the second mesh pattern are arranged on a first side of the base substrate; and the third mesh pattern and the fourth mesh pattern are arranged on a second side of the base substrate, and the second side is opposite to the first side.

14. The touch panel according to claim 9, further comprising a first base substrate and a second base substrate, wherein the first base substrate and the second base substrate are opposite to each other, wherein, the first mesh pattern and the second mesh pattern are arranged on the first base substrate; and the third mesh pattern and the fourth mesh pattern are arranged on the second base substrate.

15. The touch panel according to 14, wherein the third mesh pattern and the fourth mesh pattern are arranged on a side of the second base substrate away from the first base substrate.

16. The touch panel according to claim 9, further comprising: a touch detection device, wherein a layer where the first mesh pattern and the second mesh pattern are located is a first touch electrode layer, a layer where the third mesh pattern and the fourth mesh pattern are located is a second touch electrode layer, the touch detection device is electrically connected with a plurality of the capacitive touch electrodes of the first touch electrode layer through first terminals respectively, and the touch detection device is electrically connected with a plurality of the another capacitive touch electrodes of the second touch electrode layer through second terminals respectively, and the touch detection device is electrically connected with a plurality of the electromagnetic touch electrodes of the first touch electrode layer through third terminals respectively, and the touch detection device is electrically connected with a plurality of the another electromagnetic touch electrodes of the second touch electrode layer through fourth terminals respectively.

17. The touch display panel according to claim 16, further comprising a display layer, wherein the display layer comprises a plurality of signal lines, the plurality of the signal lines are intersected with each other;

an orthographic projection of at least a portion of the plurality of first mesh lines or an orthographic projection of at least a portion of the second mesh line on the display layer intersects with the signal lines and is not perpendicular to the signal lines.

18. A touch display device, comprising the touch display panel according to claim 16.

* * * * *